(12) United States Patent
Hashimoto

(10) Patent No.: US 6,625,102 B1
(45) Date of Patent: Sep. 23, 2003

(54) OPTICAL DEVICE

(75) Inventor: Nobuyuki Hashimoto, Irima (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/913,025

(22) PCT Filed: Mar. 30, 1999

(86) PCT No.: PCT/JP99/03529

§ 371 (c)(1),
(2), (4) Date: Aug. 9, 2001

(87) PCT Pub. No.: WO00/55677

PCT Pub. Date: Sep. 21, 2000

(30) Foreign Application Priority Data

Mar. 15, 1999 (JP) .............................. 11-067676
Apr. 16, 1999 (JP) .............................. 11-109196

(51) Int. Cl.$^7$ .............................................. G11B 7/00
(52) U.S. Cl. ............................. 369/112.16; 369/110.02; 369/112.21
(58) Field of Search ................. 369/110.01, 110.02, 369/110.03, 110.04, 112.01, 112.16, 112.17, 112.19, 112.2, 112.21, 112.22, 112.23

(56) References Cited

U.S. PATENT DOCUMENTS

| | | | |
|---|---|---|---|
| 4,389,649 A | | 6/1983 | Parkhurst et al. ........... 343/17.5 |
| 5,508,992 A | * | 4/1996 | Hirose et al. ........... 369/112.17 |
| 5,586,095 A | | 12/1996 | Ichiura et al. ........... 369/44.24 |
| 5,737,299 A | | 4/1998 | Yoo et al. |
| 6,115,345 A | * | 9/2000 | Kato et al. .............. 369/112.19 |
| 6,191,829 B1 | | 2/2001 | Hashimoto ................... 349/17 |

FOREIGN PATENT DOCUMENTS

| | | |
|---|---|---|
| JP | 07037269 A | 2/1995 |
| JP | 08087773 | 4/1996 |
| JP | 8-101365 | 4/1996 |
| JP | 08249716 | 9/1996 |
| JP | 10062714 A | 3/1998 |
| WO | WO98/15952 | 4/1998 |

OTHER PUBLICATIONS

Guoguang Yang, "An optical pickup using a diffractive optical element for a high–density optical disc," *Optics Communications* 159 (1999) 19–22.

* cited by examiner

Primary Examiner—Muhammad Edun
(74) Attorney, Agent, or Firm—Finnegan, Henderson, Farabow, Garrett & Dunner, L.L.P.

(57) ABSTRACT

The present invention provides an optical device that eliminates side lobes or their components from a super-resolution optical spot, and that is capable of electrically switching between super resolution and normal resolution as needed in simple manner. The optical device having a light generating unit for generating incident light and a lens system for collecting the incident light and producing a super-resolution optical spot containing a main lobe and a side lobe by modulating a portion of the incident light, comprises a polarization vector modulation unit for making polarization vectors of the side lobe and the main lobe differ from each other so that one or the other of the polarization vectors can be selected, and a polarization selective unit for eliminating the side lobe by selecting the polarization vector of the main lobe.

61 Claims, 14 Drawing Sheets

Fig.10
(a)
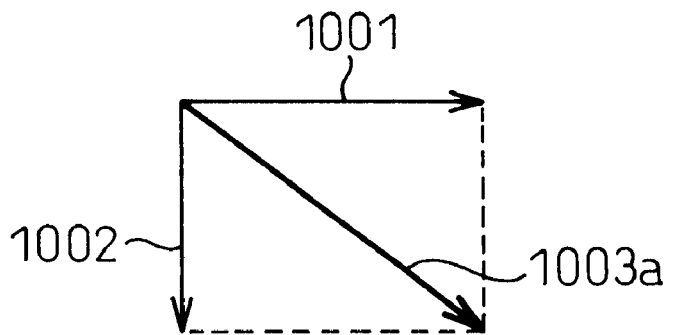
(b)
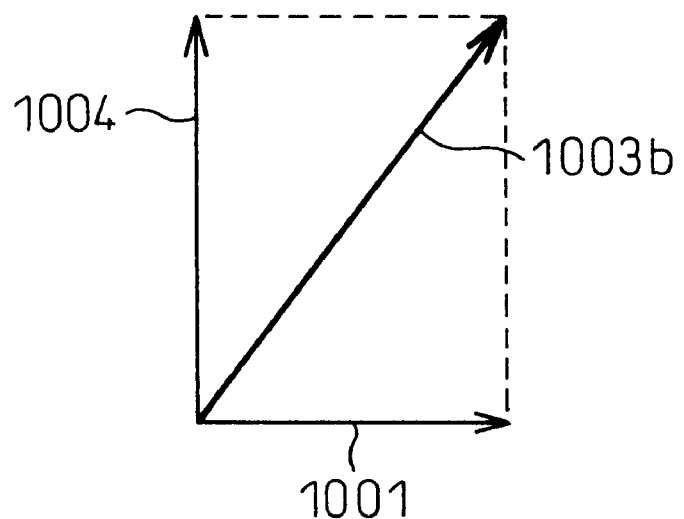

Fig.11
(a)
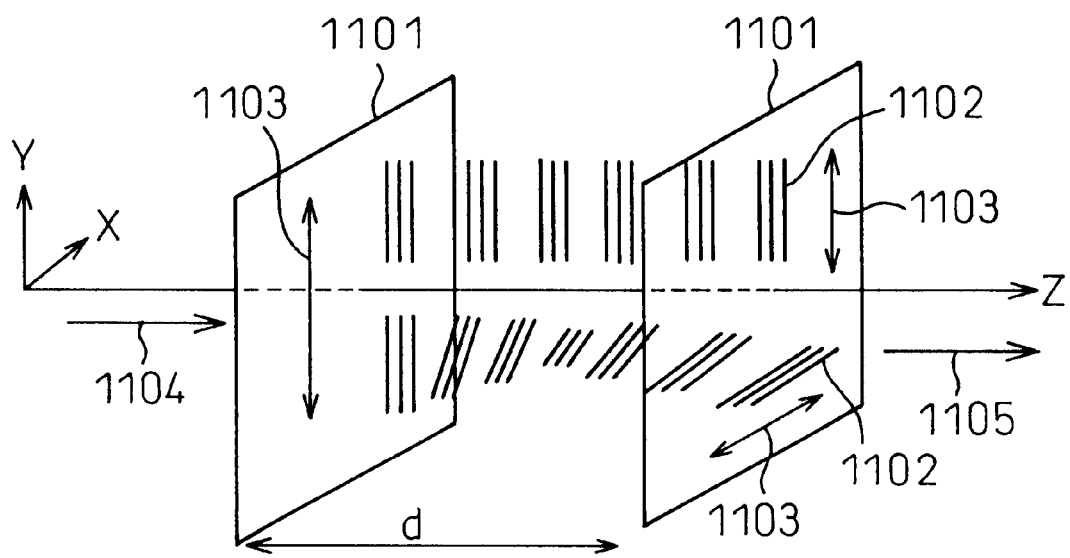
(b)
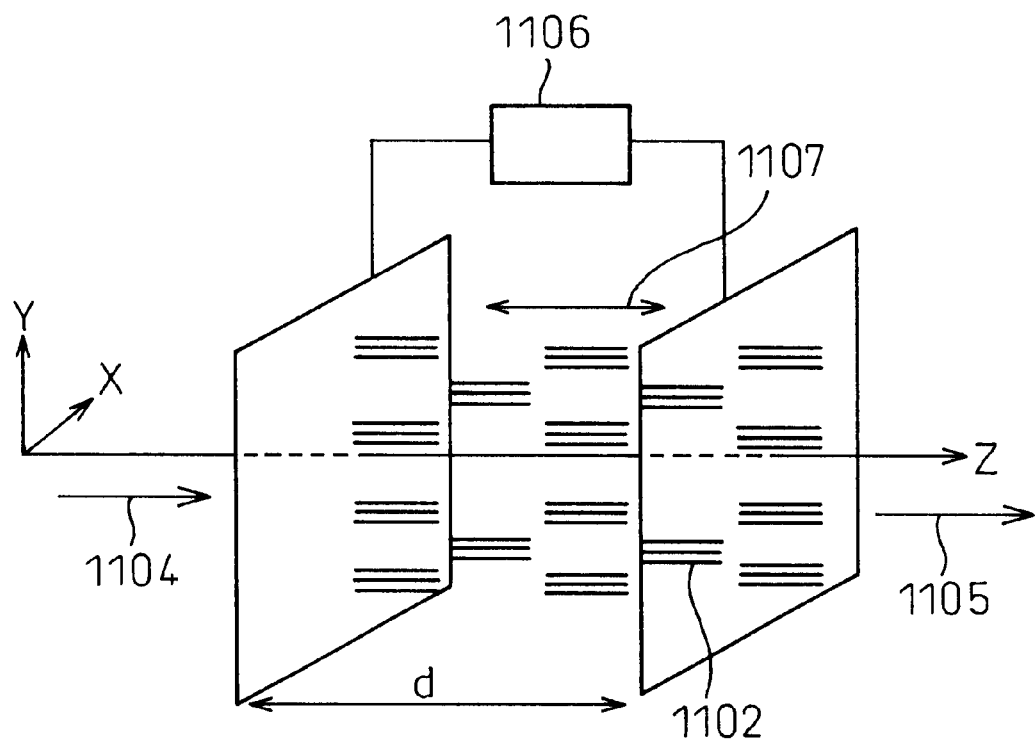

Fig.12
(a)
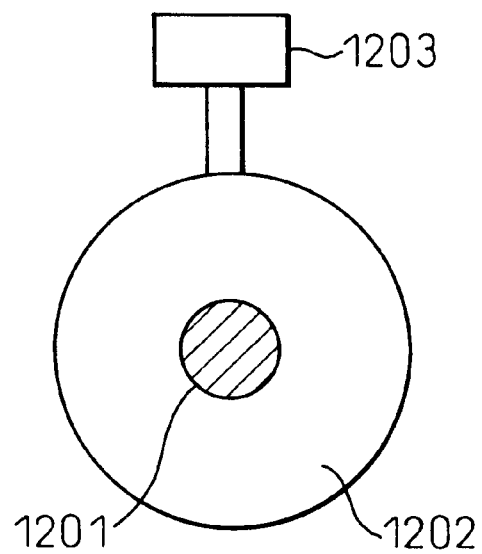
(b)
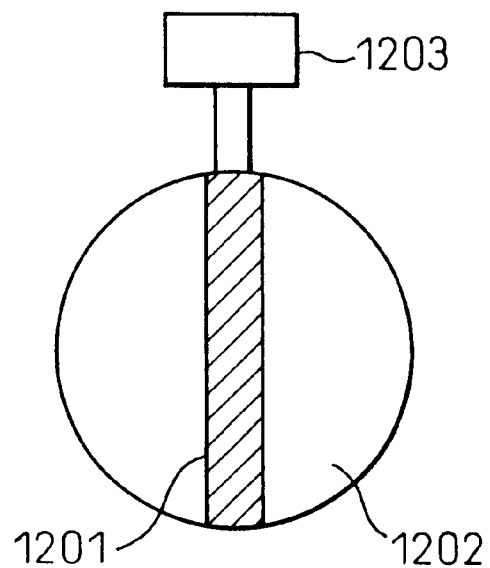

Fig. 16
(a)
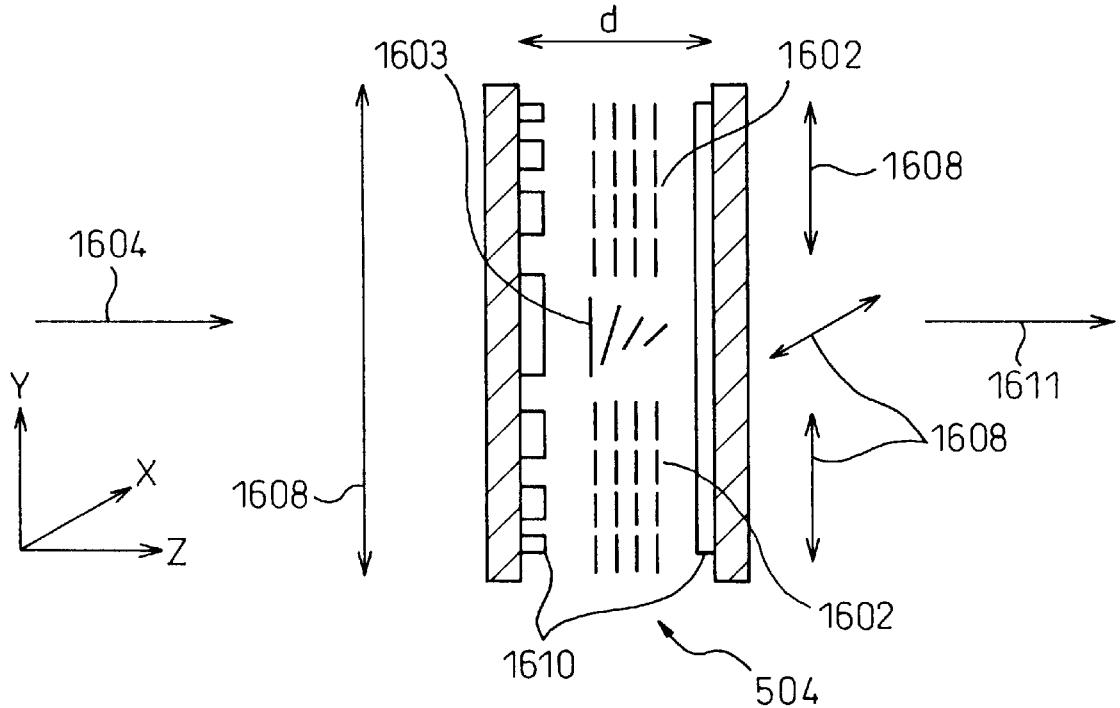
(b)
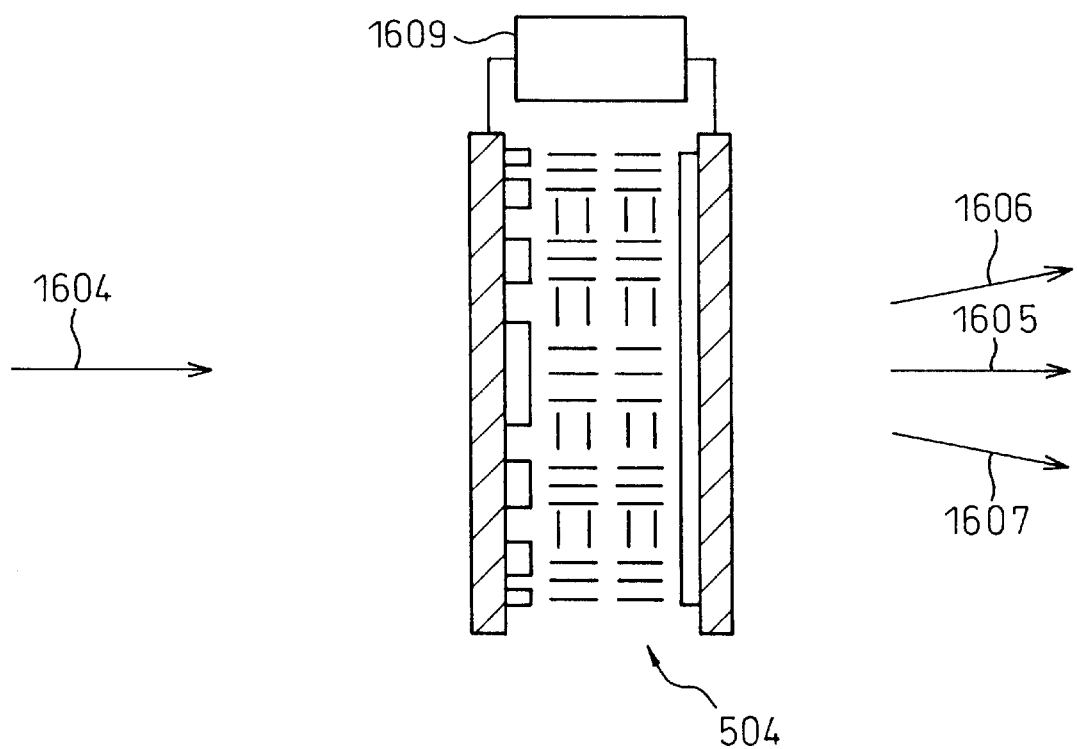

OPTICAL DEVICE

TECHNICAL FIELD

The present invention relates to an optical super-resolution technique for improving resolution beyond the theoretical resolution limit of an optical device well corrected for aberration. The invention also relates to a technique for eliminating side lobes peculiar to super resolution. More particularly, the invention relates to a technique for improving the resolution of an optical pickup for an optical disk.

BACKGROUND ART

The theoretical resolution limit of an optical device will be briefly explained. In an optical device designed to be substantially free from aberration in geometrical optics, the spot image it produces is focused as an infinitely small optical spot. In reality, however, the optical spot exhibits a finite degree of spreading because of the diffraction arising as a consequence of the wave nature of light. Here, when the numerical aperture of the optical device, which contributes to the focusing or converging of the spot, is denoted by NA, the physical definition of the optical spot spreading is given by the formula k×λ÷NA, where λ is the wavelength of light, and k is a constant that depends on the optical device and usually takes a value between 1 and 2. The numeral aperture NA is, in general, proportional to D/f which is the ratio of the effective entrance pupil diameter, D, of the optical device (usually, the effective beam diameter) to the focal length, f, of the optical device.

Therefore, if the theoretical resolution of the optical device is to be increased, that is, if the optical spot is to be focused to a smaller diameter, either light of a shorter wavelength should be used or the numerical aperture NA should be increased.

The wavelength of a commonly used laser light source is 780 nm or 650 nm. In recent years, a laser light source with a wavelength of 410 nm has been developed. However, a laser light source having a wavelength of 380 nm or shorter is either difficult to achieve or costly to implement.

On the other hand, as the numerical aperture NA of the optical device increases, it becomes increasingly difficult to design the optical device to be free from aberration in geometric optics. Further, the focal depth of the optical device decreases with the square of the numerical aperture NA, while the coma of the optical device increases with the cube of the numerical aperture NA. Under the current circumstances, therefore, designing an optical device with a numerical aperture NA of about 0.7 or larger is either difficult to achieve or costly to implement.

It should also be noted that optical materials used to construct optical devices are opaque to light at 380 nm and shorter wavelengths. As a result, optical devices using such optical materials have the disadvantage that light cannot be effectively utilized.

Considering the above limitations, the maximum recording density of an optical disk that can be read with the smallest optical spot at the present time is about 12 GB (gigabytes) in the case of an optical disk about 3.5 inches in diameter. Accordingly, if pits exceeding this recording density limit are formed on an optical disk, the pits cannot be read properly with the above optical spot.

In view of this, a technique for achieving a super-resolution optical device, such as described in "O plus E" (No. 154, pp. 66–72, 1992), has been proposed in order to further improve the above-described theoretical resolution limit of the optical device. This technique enables the optical spot size to be made 10 to 20% smaller than the theoretical limit of the optical device by blocking a portion of the effective beam of converging optics by means of a light-shielding plate. This is equivalent to increasing the numerical aperture NA of the optical device or making the wavelength of the light source shorter.

The super-resolution optical device, however, has had the problem that when an optical spot is formed, side lobes or relatively large peaks peculiar to super resolution appear on both sides of the spot, making the optical spot appear as if it has three peaks.

This phenomenon will be explained with reference to FIGS. 6 and 7. First, as shown in FIG. 6, the aperture of a converging lens 603 is blocked using a shield mask 602 of radius r around its optical axis 601. The radius r is smaller than the radius of an effective beam 604. FIG. 6 shows a cross-sectional view of the optical device, but it should be noted that the actual optical device has a shape that is rotationally symmetrical about its optical axis 601.

At this time, the optical spot 701 formed at point P, i.e., the focal point of the converging lens 603, can be considered as shown in FIG. 7. That is, the optical spot 701 is the result of subtracting an imaginary optical spot 703, formed due to the shield mask 602, from the optical spot 702 formed by the effective beam 604. It is seen that the optical spot 701 at point P at this time is narrower than the optica spot 702 formed by the effective beam 604, and has side lobes 704 (portions lying in the negative side in FIG. 7).

In FIG. 7, the side lobes 704 are negative in value, and optically this means that the phase of the light wave is shifted by 180 degrees compared with the positive portions, that is, the phase is reversed. From the viewpoint of light intensity, however, these side lobes 704 also have light intensities. As a result, an optical spot having three peaks is formed at point P. In FIG. 7, the complex amplitude is plotted along the vertical axis and the position along the horizontal axis.

The light spot having such three peaks has involved a problem when it is applied, among other things, to optical disk pickups. In view of this, a technique for eliminating only side lobes by placing very fine slits in the light path is proposed in "Optics" (Vol. 18, No. 12, pp. 691–692, 1989). However, the slits have had to be aligned very carefully, since if the slit position is displaced, portions of the optical spot other than the side lobe portions are also blocked. Furthermore, adherence of dust to slit gaps has also been a problem. A further problem has been that since slits are used to block light, even if the slits are properly adjusted in place, diffraction of light still occurs due to the presence of the slits, causing side lobes, though of lesser degree.

Accordingly, it is an object of the present invention to provide an optical device that solves the above problems and that can eliminate only side lobes or side lobe components from a super-resolution optical spot.

It is another object of the invention to provide an optical device that can easily switch between super resolution and normal resolution by using a simple method.

DISCLOSURE OF THE INVENTION

To attain the above objects, the present invention provides the following configuration.

The optical device of the invention is one that includes a light generating means for generating incident light and a lens system for collecting the incident light, and produces a super-resolution optical spot containing a main lobe and a side lobe by modulating a portion of the incident light, and comprises a polarization vector modulating means for making the polarization vectors of the side lobe and the main lobe differ from each other so that one or the other of the polarization vectors can be selected, and a polarization selective means for eliminating the side lobe by selecting the polarization vector of the main lobe.

More particularly, the optical device comprises a means for generating linearly polarized light, an optically rotating element for converting the linearly polarized light into a beam that generates a main lobe and a side lobe oriented in a different direction than the main lobe, and a polarization selective means for eliminating only the side lobe from the beam.

Here, the optically rotating element comprises a homogeneous-type liquid crystal element and a 90-degree twisted nematic liquid crystal element whose orientation axis of liquid-crystal molecular is oriented substantially parallel or perpendicular to the polarization axis of the linearly polarized light.

Further, the polarization selective means is disposed so as to have as azimuth whose angle, relative to the azimuth of the linearly polarized light incident on the optically rotating element, is not smaller than 0 degree and not greater than 90 degrees, when measured toward the direction in which the optically rotating element rotates the linearly polarized light through 90 degrees.

In another aspect of the invention, the optical device comprises a means for generating linearly polarized light, an optically rotating element for converting the linearly polarized light into a beam that generates a main lobe and a side lobe oriented in a direction different to the main lobe, a first collective lens for collecting the beam onto an optical disk; an optical detector for detecting information recorded on the optical disk, a second collective lens for collecting a beam, reflected from the optical disk, onto the optical detector; and a polarization selective means for eliminating only the side lobe from the beam.

Here, the optically rotating element has a rotatory power that is capable of being enabled or disabled electrically, and the beam is converged on a different kind of optical disk when the rotatory power of the optically rotating element is disabled than when the optical activity of the optically rotating element is enabled.

The different kinds of optical disks here refer, for example, to a DVD and a CD, respectively, or a DVD and a CD-R(W), respectively.

In a further aspect of the invention, the optical device comprises a means for generating linearly polarized light, a diffraction lens element whose diffraction function is capable of being enabled or disabled by an electrical signal, an optically rotating element for converting the linearly polarized light into a beam that generates a main lobe and a side lobe oriented in a different direction than the main lobe, a collective lens for collecting the beam onto an optical disk, and a polarization selective means for eliminating only the side lobe from the beam.

Here, when the diffraction function of the diffraction lens element is enabled, the optical device has a focal length equal to the sum of the focal lengths of the diffraction lens element and the collective lens, while when the diffraction function of the diffraction lens element is disabled, the focal length of the optical device is equal to the focal length of only the converging lens.

Further, the beam is converged on a different kind of optical disk when the diffraction function of the diffraction lens element is disabled than when the diffraction function of the diffraction lens element is enabled.

The different kinds of optical disks here refer, for example, to a DVD and a CD, respectively, or a DVD and a CD-R(W), respectively.

BRIEF DESCRIPTION OF THE DRAWINGS

FIG. 10 is a diagram showing the polarization state of a super-resolution optical spot according to the present invention.

FIG. 11 is a diagram illustrating the operation of a liquid crystal employed in the present invention.

FIG. 12 is a diagram showing the structure of an optically rotating element constructed using a liquid crystal element.

FIG. 16 is a diagram showing a basic cross-sectional structure of a liquid-crystal spatial light modulator employed in the present invention.

DETAILED DESCRIPTION OF THE INVENTION (Embodiment 1)

Figure 1:
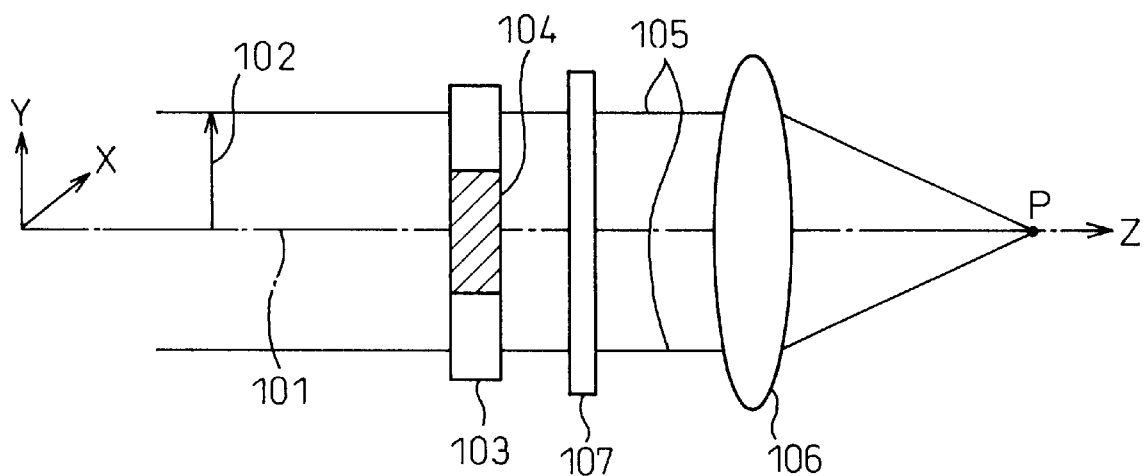
FIG. 1 is a diagram showing a configuration example of an optical device according to a first embodiment of the present invention.

A first embodiment of the present invention will be described with reference to FIG. 1. FIG. 1 shows a cross-sectional view of an optical device, but it should be noted that the actual optical device has a shape that is rotationally symmetrical about its optical axis 101. Linearly polarized light 102 is a beam of light emitted from a laser light source such as a semiconductor laser, not shown, and made substantially parallel by a collimator lens or the like. The linearly polarized light 102 whose polarization direction is parallel to the Y-axis direction passes through an optically rotating element 103. At this time, the polarization direction of a portion of the linearly polarized light 102 is rotated through 90 degrees as it passes through the center portion 104 (indicated by oblique hatching in the figure) of the optically rotating element 103, and the polarization direction of that portion is thus made substantially parallel to the X-axis direction. The optically rotating element 103 does not have any phase distribution for the linearly polarized light 102. That is, the optical path lengths of the beam of light passing through the center portion 104 of the optically rotating element 103 and the beam of light passing through the other portion thereof are the same.

The effective beam 105 passed through the optically rotating element 103 is focused to point P by a collective lens 106. At this time, a super resolution phenomenon occurs at point P, as described in International Publication WO 98/15952. That is, the polarization axis of the light passed through the center portion 104 is rotated 90 degrees with respect to the light passed through the other portion. Since it is known that two orthogonal linearly polarized light components do not interfere with each other, the center portion 104, as opposed to the other portion, behaves as if it were covered with a shield mask. A polarization selective means 107 eliminates the side lobes of the super-resolution optical spot formed at point P by the optically rotating element 103.

Figure 7:
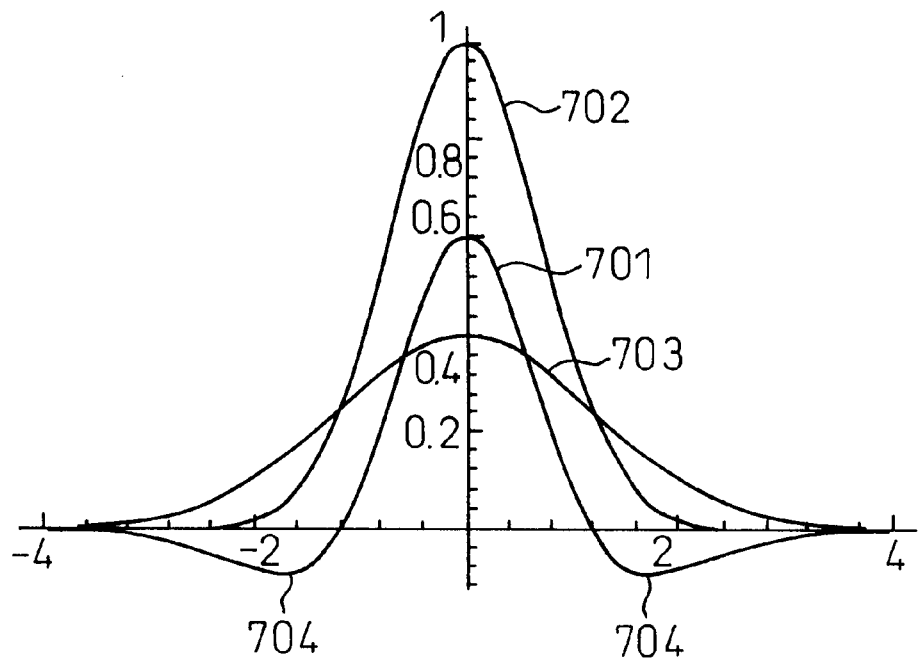
FIG. 7 is a diagram for explaining an optical spot formed by the super-resolution optical device.
Figure 8:
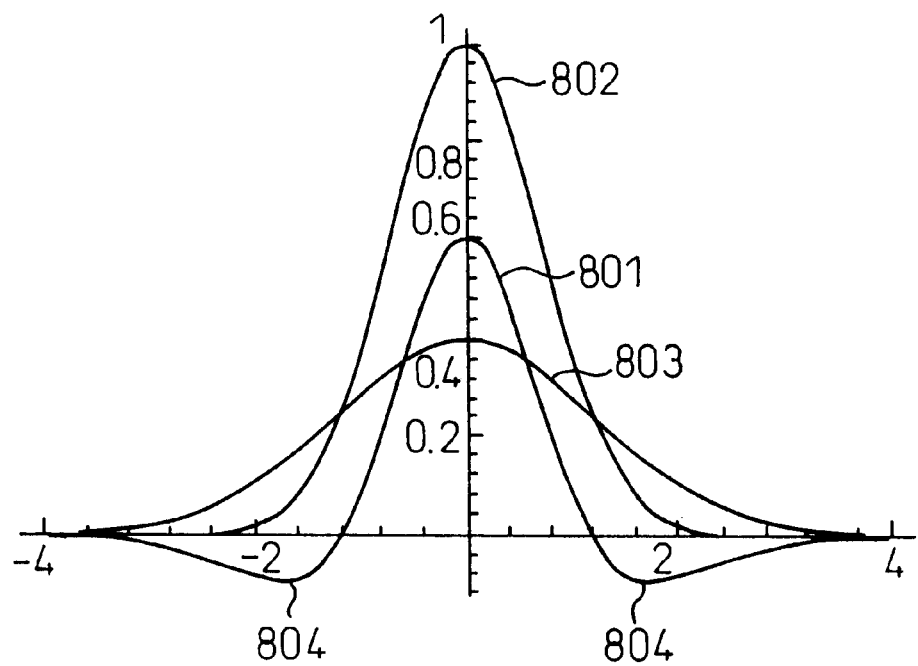
FIG. 8 is a diagram for explaining an optical spot formed by the optical device of the present invention.

The shape of the super-resolution optical spot 801 that would be formed at point P in FIG. 1 in the absence of the polarization selective means 107 will be studied with reference to FIG. 8. In FIG. 8, the complex amplitude is plotted along the vertical axis and the position along the horizontal axis. As can be seen from the explanation previously given in connection with FIG. 7, the super-resolution optical pot 801 is the result of subtracting the optical spot 803 formed due to the center portion 104 from the optical spot 802 formed by the entire effective beam 105.

Though the two orthogonal linearly polarized light components do not interfere with each other, their intensities are added together. As a result, unlike the case of FIG. 7, the intensity of the optical spot actually formed at point P is the sum of the intensity of the super-resolution optical spot 801 (that is, the square of the absolute value) and the intensity of the optical spot 803 formed due to the center portion 104.

Figure 9:
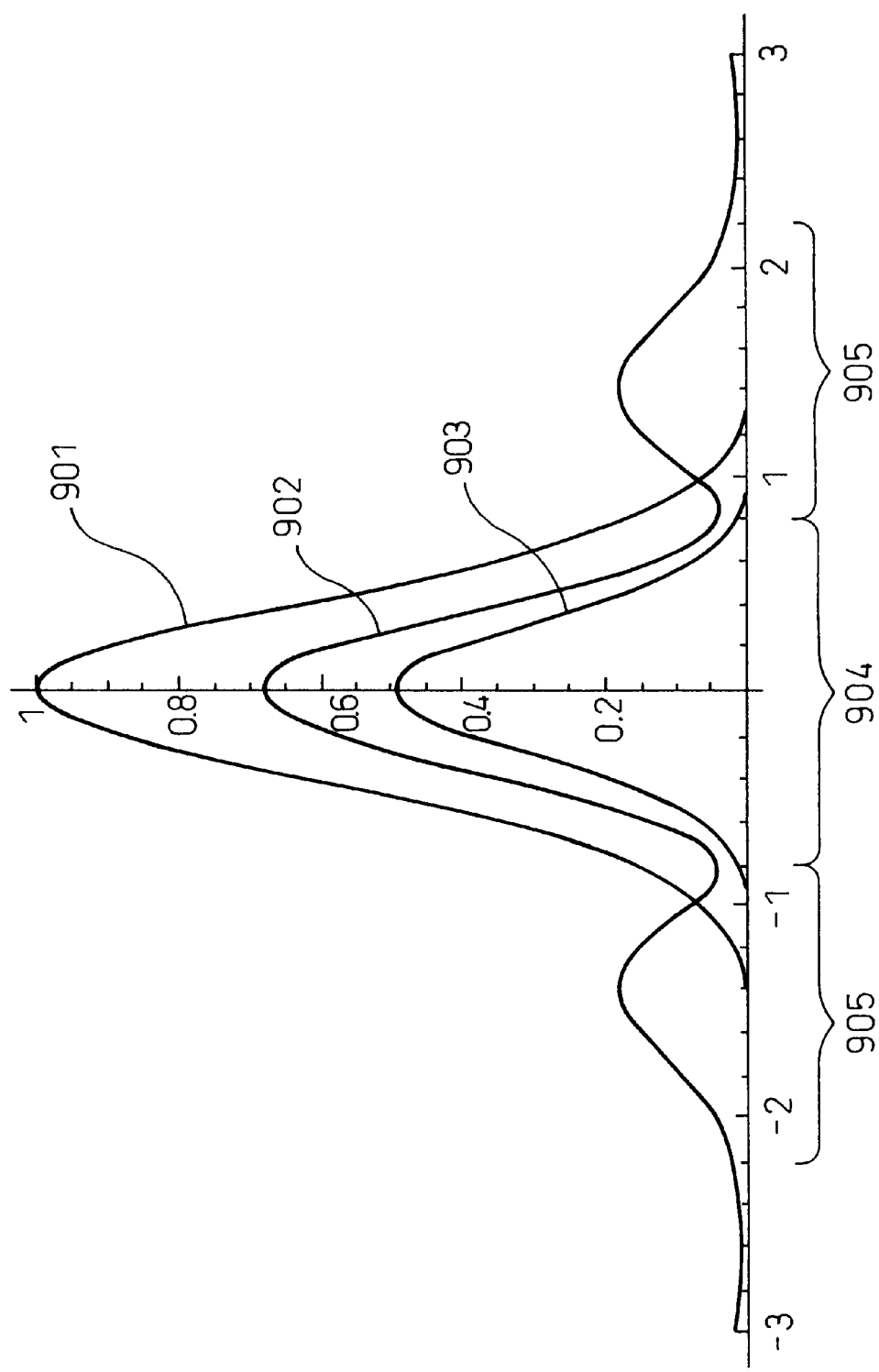
FIG. 9 is a diagram for explaining the intensity of the optical spot formed by the optical device of the present invention.

FIG. 9 shows the intensity of the optical spot formed at point P. In FIG. 9, the intensity of light is plotted along the vertical axis and the position along the horizontal axis. Reference numeral 901 shows the intensity of the optical spot formed by the entire effective beam 105. Reference numeral 902 shows the intensity of the optical spot actually formed at point P. The intensity of this optical spot is the sum of the intensity of the super-resolution optical spot 801 (that is, the square of the absolute value) and the intensity of the optical spot 803 formed due to the center portion 104 (that is, the square of the absolute value).

Next, the polarization states and relative phases of the respective portions of the optical spot will be considered by comparing FIGS. 8 and 9. First, the optical spot 803 due to the center portion 104 is linearly polarized in the X-axis direction. The super-resolution optical spot 801 is linearly polarized in the Y-axis direction. However, the side lobes 804 of the super-resolution optical spot 801 are reversed in phase compared with the other portions of the spot, and can therefore be considered to be linearly polarized in the negative Y-axis direction.

Here, the side lobes 905 of the optical spot 902 with the intensity shown in FIG. 9 will be considered. Each side lobe has a polarization vector given by the sum of the optical spot 803 due to the center portion 104 and the side lobe 804 of the super-resolution optical spot 801. That is, as shown in FIG. 10(a), the polarization vector is a linearly polarized beam of light having a resultant vector 1003a given by the sum of the polarization vector 1001 due to the center portion 104 and the polarization vector 1002 of the side lobe 804 of the super-resolution optical spot 801. As earlier noted, the optically rotating element 103 does not have any phase distribution for the incident light. As a consequence, when the two linearly polarized light components are superimposed in phase or out of phase by 180 degrees (or an integral multiple of it), their resultant is also linearly polarized light.

Next, the main lobe 904 of the optical spot 902 with the intensity shown in FIG. 9 will be considered. The main lobe has a polarization vector given by the sum of the optical spot 803 due to the center portion 104 and the portion of the super-resolution optical spot 801 other than the side lobes 804 thereof. That is, as shown in FIG. 10(b), the polarization vector is a linearly polarized beam of light having a resultant vector 1003b given by the sum of the polarization vector 1001 due to the center portion 104 and the polarization vector 1004 of the portion of the super-resolution optical spot 801 other than the side lobes thereof.

What should be noted here is that the direction of the resultant vector 1003a of the linearly polarized light at each side lobe 905 of the optical spot 902, shown in FIG. 10(a), is always different from the direction of the resultant vector 1003b of the linearly polarized light at the main lobe 904 of the optical spot 902, shown in FIG. 10(b).

Accordingly, as can be understood from FIGS. 10(a) and (b), if a linear polarization detection element 107 whose detection axis is oriented at right angles to the direction of the resultant vector 1003a is used as the polarization selective means and placed directly behind the optically rotating element 103, the resultant vector 1003a of the linearly polarized light at each side lobe can be made to disappear. As a result, the side lobes 905 of the super-resolution optical spot 902, to be formed at point P in FIG. 1, can be eliminated. It is also seen that, at this time, the resultant vector 1003b does not appear.

The waveform produced by eliminating the side lobes 905 of the optical spot using the polarization selective means is shown at 903 in FIG. 9. The intensity of the center portion of the spot 903 is lower than that of the spot 902 primarily because the polarization selective means is not 100% transparent.

From FIGS. 10(a) and (b), it can be seen that the orientation θ of the linear polarization detection element 107 that can make the side lobes of the super-resolution optical spot to disappear lies within a range of angles not smaller than 0 degree and not greater than 90 degrees, the angle being measured toward the X-axis direction, with the Y-axis direction as 0 degree. More particularly, θ approaches 90 degrees as the magnitude of the polarization vector 1001 due to the center portion 104, and hence the area of the center portion 104, decreases.

The linear polarization detection element 107 need not necessarily be placed directly behind the optically rotating element 103. However, according to the Fourier image forming theory, the components of an optical spot being collected to the focal point of a lens are spread uniformly within the entire effective beam directly behind the lens, but the uniformity is gradually lost as the beam nears the focal point. That is, directly behind the collective lens 106, the directions of the resultant vectors 1003a and 1003b in FIGS. 10(*a*) and 10(*b*) are consistent at any point on the XY plane. In other words, directly behind the collective lens 106, the side lobe components of the super-resolution optical spot are uniformly spread within the effective beam 105. However, since the beam is gradually focused into a spot, the uniformity is lost as the beam nears the focal point P. That is, if the linear polarization detection element 107 is placed too close to the focal point P, the side lobe component can only be eliminated partially on the XY plane, which is undesirable.

(Embodiment 2)

Figure 2:
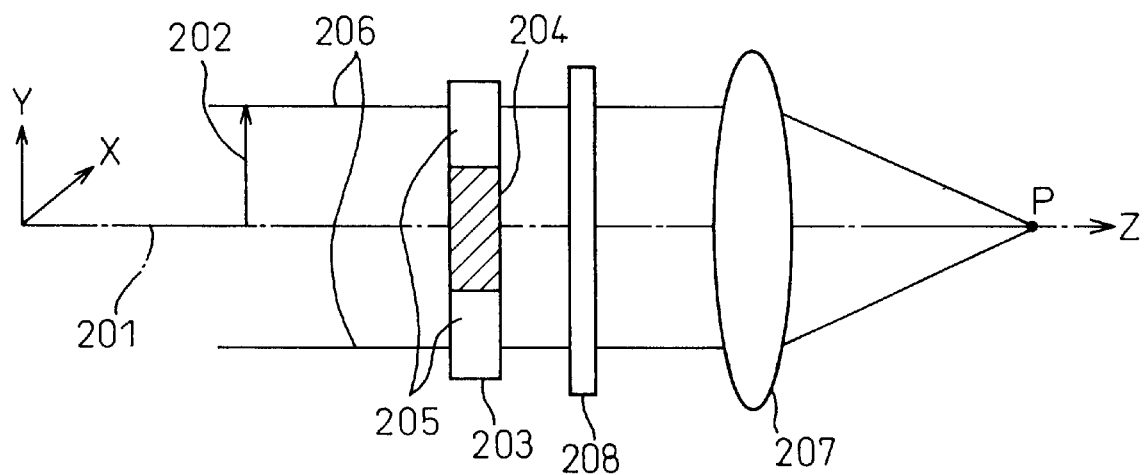
FIG. 2 is a diagram showing a configuration example of an optical device according to a second embodiment of the present invention.

Next, a second embodiment of the present invention will be described with reference to FIG. 2. FIG. 2 shows a cross-sectional view of an optical device, but it should be noted that the actual optical device has a shape that is rotationally symmetrical about its optical axis 201. Linearly polarized light 202 is a beam of light emitted from a laser light source such as a semiconductor laser, not shown, and made substantially parallel by a collimator lens or the like. The linearly polarized light 202, whose polarization direction is parallel to the Y-axis direction, passes through an optically rotating element 203. The polarization direction of a portion of the linearly polarized light 202 is rotated through 90 degrees as it passes through the center portion 204 (indicated by oblique hatching in the figure) of the optically rotating element 203, and the polarization direction of that portion is thus made substantially parallel to the X-axis direction. The optically rotating element 203 does not have any phase distribution for the linearly polarized light 202. That is, the optical path lengths of the beam of light passing through the center portion 204 of the optically rotating element 203 and the beam of light passing through the other portion thereof are the same.

The effective beam 206 passed through the optically rotating element 203 is focused to point P by a collective lens 207. At this time, a super resolution phenomenon occurs at point P, as described in International Publication WO 98/15952. That is, the polarization axis of the light passed through the center portion 204 is rotated 90 degrees with respect to the light passed through the other portion. Since it is known that two orthogonal linearly polarized light components do not interfere with each other, the center portion 204, as opposed to the other portion, behaves as if it were covered with a shield mask. A polarization selective means 208 eliminates the side lobes of the super-resolution optical spot formed at point P by the optically rotating element 203.

The difference from the first embodiment of the invention shown in FIG. 1 is that a liquid crystal element is used as the optically rotating element that does not introduce phase modulation.

First, to facilitate an understanding of the present invention, the optical activity and phase modulation ability that a liquid crystal element has will be described with reference to FIGS. 11(*a*) and 11(*b*).

FIGS. 11(*a*) and 11(*b*) schematically illustrate the optical activity of an electrically controllable, conventional homogeneous-type liquid crystal element and twisted nematic liquid crystal element. Liquid crystal molecules 102 are sandwiched between glass substrates 1101 coated with transparent electrodes On the entrance-side glass substrate, an orientation axis 1103 of the entire liquid crystal lies parallel to the Y-axis direction. On the exit-side glass substrate, on the other hand, while the orientation axis 1103 of the liquid crystal in the upper half portion remains lying parallel to the Y-axis direction, the orientation axis 1103 of the liquid crystal in the lower half portion lies parallel to the X-axis direction.

The liquid crystal molecules 1102 have the property that their long axes tend to point in the same direction along the orientation axis, as well as the property that the molecules behave as a continuum. As a result, as shown in FIG. 11(*a*), the liquid crystal molecules 1102 in the upper half of the liquid crystal element are aligned in parallel to the Y-axis direction, and the liquid crystal of this structure is called the homogenous-type liquid crystal. On the other hand, the liquid crystal molecules 1102 in the lower half are gradually and smoothly rotated through 90 degrees, and the liquid crystal of this type is called the 90-degree twisted nematic liquid crystal.

When incident light 1104 linearly polarized in the Y-axis direction enters this liquid crystal element, the linearly polarized light 1104 propagates therethrough with its polarization axis being caused to align with the long axis direction of the liquid crystal molecules 1102 because of the dielectric anisotropy of the liquid crystal molecules. That is, in the upper half portion, the polarization axis of the linearly polarized light 1105 emerging from it is aligned in the Y-axis direction, while in the lower half portion, the polarization axis is aligned in the X-axis direction, i.e., at right angles to that in the upper half. This means that the linearly polarized light propagated through the 90-degree twisted nematic liquid crystal element has undergone a 90-degree optical rotation.

When the refractive index in the long axis direction of the liquid crystal molecules in denoted by n1 and the refractive index in the short axis direction by n2, the optical path length of the linearly polarized incident light 1104 traversing the liquid crystal layer is given by n1×d for both the upper and lower portions, where d is the thickness of the liquid crystal layer. Accordingly, phase differences due to differences in optical path length do not occur between them. That is, the liquid crystal element does not have any phase distribution for the linearly polarized incident light 1104.

Strictly speaking, for the linearly polarized incident light 1104 to emerge as linearly polarized light, it is required, as is known in the art, that the polarization axis of the linearly polarized incident light 1104 be oriented parallel to the direction 1103 at the incident side, i.e., the long axis direction of the liquid crystal molecules, and that 2×(n1−n2)×d+λ be equal to the square root of any one of the numbers 3, 15, 35, etc., where n1 is the refractive index in the long axis direction of the liquid crystal molecules, n2 the refractive index in the short axis direction of the liquid crystal molecules, λ (nm) the wavelength of the incident light, and d (nm) the thickness of the liquid crystal layer or the cell gap. Here, the case where 2×(n1−n2)×d+λ is equal to 3 is called a first minimum, the case where it is equal to 15 is called a second minimum, and the case where it is equal to 35 is called a third minimum. These values are derived from the equation $(1 \times x) = (2 \times n)^2$ (n is an integer), and x=3 when n=1 (corresponds to the first minimum), x=15 when n=2 (corresponds to the second minimum), and x=35 when n=3 (corresponds to the third minimum). Generally, the larger the value n, the more stable emergence of linearly polarized light is guaranteed against temperature and wavelength variations. However, the disadvantage is that increasing the value n leads to slower response time and narrower viewing angle. In the present embodiment, since response time and viewing angle are not major concerns, the larger the value n, the better. However, if n is made too large, there arises the problem that the alignment state of liquid crystal becomes unstable. Accordingly, the value n is preferably set within a range of 3 to 10, and more preferably within a range of 3 to 6. However, no practical problems would occur if the wavelength of the light used, the refractive index of the liquid crystal molecules, or the thickness of the liquid crystal layer did not strictly satisfy the earlier given equation.

Figure 13:
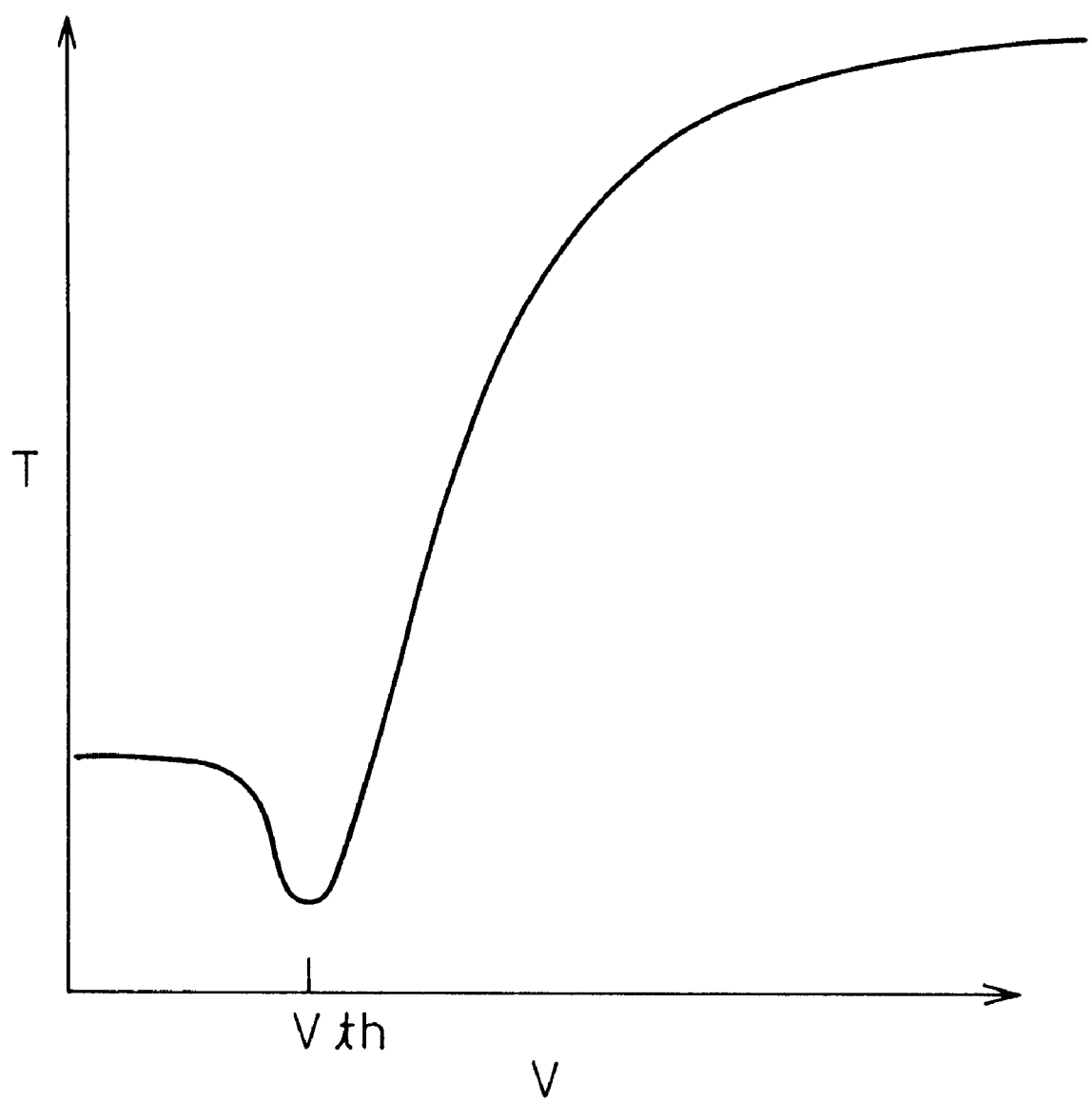
FIG. 13 is a graph illustrating the characteristic of a conventional liquid crystal.

Further, if an ideal liquid crystal is designed that strictly satisfies the previously given equation, in the presence of thermal fluctuation the liquid crystal element may not operate ideally. To address this, threshold voltage (Vth) on a liquid crystal T-V curve, such as shown in FIG. 13, should be applied for operation. The T-V curve shown in FIG. 13 is a graph depicting the relationship between applied voltage V and transmittance T when the voltage V is applied to the 90-degree twisted nematic liquid crystal of the present embodiment sandwiched between polarizers oriented parallel to each other (in this arrangement, light does not emerge from the exit polarizer unless the voltage is applied to the liquid crystal). When the voltage of Vth (1 to 1.5 V in terms of effective voltage) is applied, the least amount of light leakage occurs, the optical rotating power works most ideally, and the influence of thermal fluctuation is reduced.

As shown in FIG. 11(b), when an electric field in the Z-axis direction is applied, using a power supply 1106, to the liquid crystal element via the transparent electrodes formed on the glass substrates, the long axes of all the liquid crystal molecules 1102 align in the Z-axis direction, i.e., the direction of the electric field, and remain in this state. This state is called "homeotropic". At this time, both the upper and lower half portions of the linearly polarized emergent light 1005 are positioned in the Y-axis direction, the same direction as the linearly polarized incident light 1004. That is, the rotatory power in the lower half is lost. At this time, the optical path length of the linearly polarized incident light 1004 propagating through the liquid crystal is n2×d. It is also possible to create a state intermediate between the twisted nematic or homogeneous state and the homeotropic state by controlling the magnitude of the applied voltage. It is also known that when using the liquid crystal as an optically rotating element, the rotatory power works further ideally by always applying the threshold voltage (Vth) or a voltage near it to the liquid crystal molecules.

Next, referring to FIG. 12, a description will be given of the structure of the optically rotating element 203 of FIG. 2 constructed using the above-described liquid crystal element. In FIG. 12(a), the shaded circular portion in the center is a 90-degree twisted nematic liquid crystal element 1201, and the remaining portion is a homogeneous-type liquid crystal element 1202.

FIG. 12(b) shows an alternative structure in which the shaded rectangular portion in the center is the 90-degree twisted nematic liquid crystal element 1201 and the remaining portion is the homogeneous-type liquid crystal element 1202. When the 90-degree twisted nematic liquid crystal element 1201 is formed to cover the full diameter of the effective beam in the Y-axis direction but covers the beam diameter only partially in the X-axis direction, as in the structure shown in FIG. 12(b), super resolution occurs only in the X-axis direction.

When a suitable voltage is applied to the liquid cyrstal via an electrode 1203, the entire liquid crystal is put in the homeotropic state and optical rotating power is lost.

In FIGS. 12(a) and 12(b), if the portion formed as the 90-degree twisted nematic liquid crystal element is interchanged with the portion formed as the homogeneous-type liquid crystal element, the same desired effect can be obtained by suitably setting the orientation θ of the linear polarization detection element 107.

The linear polarization detection element 208 as the polarization selective means can be constructed using a linear polarizing filter, a polarizer, a polarizing diffraction element, a polarizing beam splitter, or a mirror arranged at the Brewster angle. This also applies to all other embodiments of the invention.

Next, the operation of the present embodiment shown in FIG. 2 will be described. FIG. 2 shows a cross-sectional view of the optical device, but it should be noted that the actual optical device has a shape that is rotationally symmetrical about its optical axis 201. The incident light 202 polarized in the Y-axis direction passes through the optically rotating element 203. Since the center portion (indicated by oblique hatching) of the optically rotating element 203 is formed from the 90-degree twisted nematic liquid crystal element 204 (in which the molecules are gradually twisted from the Y-axis direction toward the X-axis direction), the polarization direction of the linearly polarized light 202 passing through it is rotated through 90 degrees and thus made to orient in the X-axis direction. When the optically rotating element 203 shown in FIG. 12(a) is used, the portion other than the center portion is formed from the homogeneous-type liquid crystal element 205 and, therefore, does not have the ability to rotate the linearly polarized light. At this time, as is apparent from the previously given explanation, the optically rotating element 203 does not have any phase distribution for the effective beam 206 of the linearly polarized light 202. Further, at the entrance side of the liquid crystal element on which the linearly polarized light 202 is incident, an orientation axis of the liquid crystal molecules are aligned substantially parallel to the Y-axis direction.

The effective beam 206 passed through the optically rotating element 203 is focused by the collective lens 207 onto point P. At this time, a super-resolution phenomenon occurs at point P. That is, the polarization axis of the linearly polarized light passed through the 90-degree twisted nematic liquid crystal element 204 is rotated 90 degrees with respect to that of the linearly polarized light passed through the homogeneous-type liquid crystal element 205.

In this condition, when the linear polarization detection element 208 was placed directly behind the optically rotating element 203 by orienting the former at an angle of about 60 degrees, the angle being measured toward the X-axis direction with the Y-axis detection as 0 degree, the side lobes could be eliminated from the super-resolution optical spot, as previously described. In other embodiments of the present invention, when the linear polarization detection element as the polarization selective means was set in the same manner, the side lobes could likewise be eliminated.

(Embodiment 3)

Figure 3:
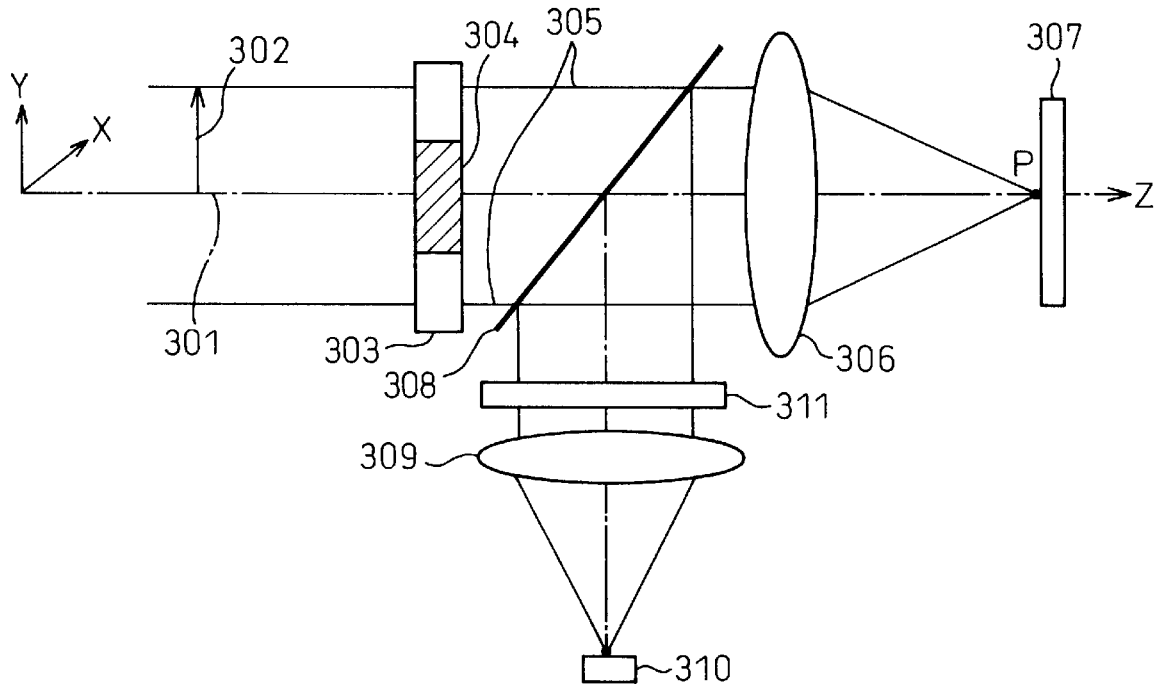
FIG. 3 is a diagram showing a configuration example of an optical device according to a third embodiment of the present invention.

A third embodiment of the present invention will be described below with reference to FIG. 3. In this embodiment, the present invention is applied to an optical disk pickup. FIG. 3 shows a cross-sectional view of the optical device, but it should be noted that the actual optical device has a shape that is rotationally symmetrical about its optical axis 301. Incident light 302 linearly polarized in the Y-axis direction passes through an optically rotating element 303 whose rotatory power is controllable by an electrical signal. The center portion 304 (indicated by oblique hatching in the figure) of the optically rotating element 303 rotates the polarization direction of the linearly polarized light 302 through 90 degrees, and thus the polarization direction of the light passing therethrough is made to orient in the X-axis direction; the portion other than the center portion 304 does not have the ability to rotate the linearly polarized light. Further, the optically rotating element 303 does not have any phase distribution for the linearly polarized light 302. That is, the linearly polarized light 302 passing through the center portion 304 of the optically rotating element 303 and that passing through the other portion thereof have the same optical path length. The effective beam 305 passed through the optically rotating element 303 is passed through an optical splitter 308, and is focused by a first collective lens 306 onto point P on an optical disk 307. At this time, a super-resolution phenomenon occurs at point P, as described in International Publication WO 98/15952. That is, the polarization axis of the light passed through the center portion 304 is rotated 90 degrees with respect to the light passed through the other portion. Since it is known that two orthogonal linearly polarized light components do not interfere with each other, the center portion 304, as opposed to the other portion, behaves as if it were covered with a shield mask.

The super-resolution optical spot focused on the optical disk 307 reads a signal recorded as a pit on the optical disk 307 and is reflected back. The reflected light is passed again through a first collective lens 306, and is reflected by the optical splitter 308 and focused by a second collective lens 309 onto an optical signal detection element 310. The optical spot focused on the optical signal detection element 310, however, has side lobes. The main lobe of the super-resolution optical spot carries information read from the intended pit on the optical disk 307. However, with the side lobes on both sides of it, adjacent pits may also be read out. In that case, the reflected light contains noise components.

Here, if a linear polarization detection element 311 as a polarization selective means is placed near the second collective lens 309 by orienting the former at right angles to the direction of the linearly polarized light contained in the side lobes, as earlier described, the side lobes are not focused on the optical signal detection element 310. The noise components can thus be eliminated from the detected light.

In the present embodiment, the linear polarization detection element 311 is placed between the optical splitter 308 and the second collective lens 309, but the position of the linear polarization detection element 311 is not limited to that particular position. For example, the linear polarization detection element 311 may be placed near the first collective lens 306 so that a super-resolution optical spot from which the side lobes have been eliminated can be focused on the optical disk 307. In that case, however, the utilization of the light to be focused on the optical disk 307 drops, since generally a linear polarization detection element is not perfectly transparent. Therefore, usually, it is sufficient to eliminate the side lobe components before the light enters the optical signal detection element 310.

Further, the linear polarization detection element 311 need not necessarily be placed near the second collective lens 309. However, according to the Fourier image forming theory, the components of an optical spot being collective to the focal point of a lens are spread uniformly within the entire effective beam directly behind the lens, but the uniformity is gradually lost as the beam nears the focal point. That is, near the second collective lens 309, the directions of the resultant vectors 1003a and 1003b in FIGS. 10(*a*) and 10(*b*) are consistent at any point on the XY plane. However, since the beam is gradually focused into a spot, the uniformity is lost as the beam nears the optical signal detection element 310. That is, if the linear polarization detection element 311 is placed too close to the optical signal detection element 310, the side lobe components can only be eliminated partially on the XY plane, which is undesirable.

Here, if the rotatory power of the optically rotating element 303 is disabled by applying an electrical signal, the super resolution is disabled and replaced by normal resolution. This means that switching from super resolution to normal resolution is accomplished by applying an electrical signal. For example, the normal resolution mode can be used when reading pits on a CD optical disk, and the super resolution mode when reading a DVD optical disk having a higher pit recording density than the CD.

(Embodiment 4)

Figure 4:
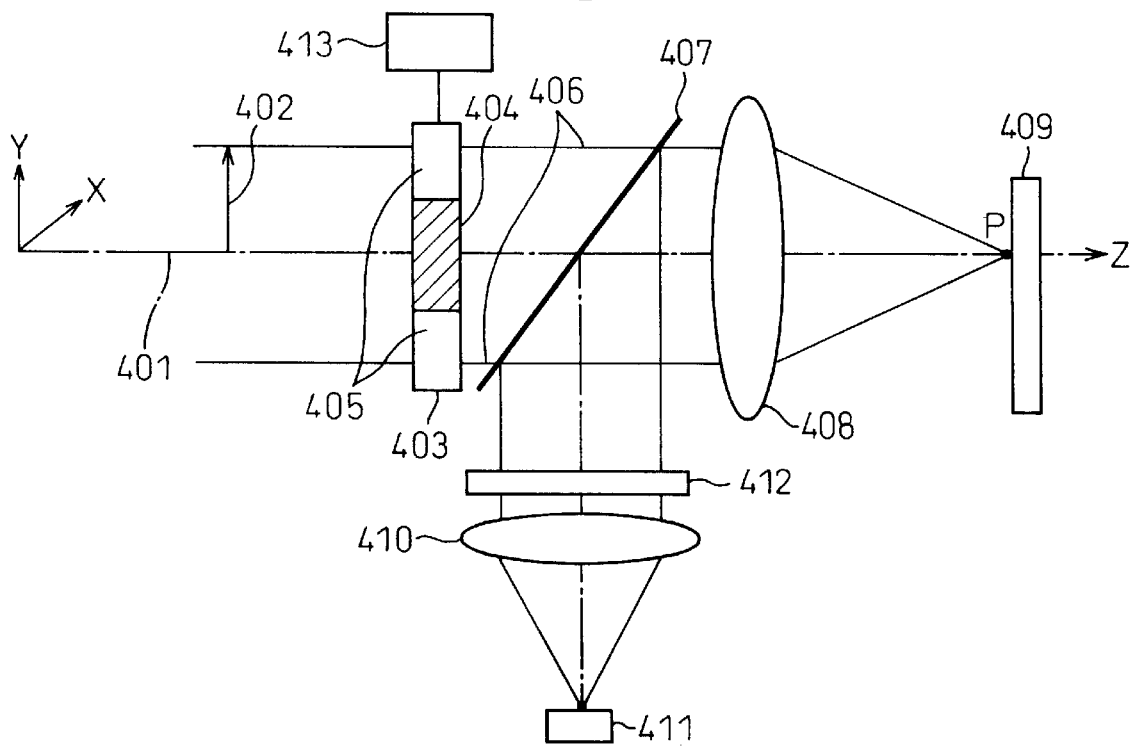
FIG. 4 is a diagram showing a configuration example of an optical device according to a fourth embodiment of the present invention.

A fourth embodiment of the present invention will be described below with reference to FIG. 4. In this embodiment, the present invention is applied to an optical disk pickup. FIG. 4 shows a cross-sectional view of the optical device, but it should be noted that the actual optical device has a shape that is rotationally symmetrical about its optical axis 401. Incident light 402 linearly polarized in the Y-axis direction passes through an optically rotating element 403 whose rotatory power is controllable by an electrical signal supplied from a power source 413. The center portion 404 (indicated by oblique hatching in the figure) of the optically rotating element 403 rotates the polarization direction of the linearly polarized light 402 through 90 degrees, and thus the polarization direction of the light passing therethrough is made to orient in the X-axis direction; the portion other than the center portion 404 does not have the ability to rotate the linearly polarized light. Further, the optically rotating element 403 does not have any phase distribution for the linearly polarized light 402. That is, the linearly polarized light 402 passing through the center portion 404 of the optically rotating element 403 and that passing through the other portion thereof have the same optical path length. The effective beam 406 passed through the optically rotating element 403 is passed through an optical splitter 407, and is focused by a first collective lens 408 onto point P on an optical disk 409. At this time, a super-resolution phenomenon occurs at point P, as described in International Publication WO 98/15952. That is, the polarization axis of the light passed through the center portion 404 is rotated 90 degrees with respect to the light passed through the other portion. Since it is known that two orthogonal linearly polarized light components do not interfere with each other, the center portion 404, as opposed to the other portion, behaves as if it were covered with a shield mask.

The super-resolution optical spot focused on the optical disk 409 reads a signal recorded as a pit on the optical disk 409 and is reflected back. The reflected light is passed again through the first collective lens 408, and is reflected by the optical splitter 407 and focused by a second collective lens 410 onto an optical signal detection element 411. The optical spot focused on the optical signal detection element 411, however, has side lobes. The main lobe of the super-resolution optical spot carries information read from the intended pit on the optical disk 409. However, with the side lobes on both sides of it, adjacent pits may also be read out. In that case, the reflected light contains noise components.

Here, if a linear polarization detection element 412 as a polarization selective means is placed near the second collective lens 410 by orienting the former at right angles to the direction of the linearly polarized light contained in the side lobes, as earlier described, the side lobes are not focused on the optical signal detection element 411. The noise components can thus be eliminated from the detected light.

This embodiment is fundamentally the same as the third embodiment, the only difference being that a liquid crystal element similar to the one used in the second embodiment is used as the optically rotating element 403 controllable by an electrical signal.

A brief description will be given below with reference to relevant drawings. Suppose that the linearly polarized light 402 polarized in the Y-axis direction is incident on the optically rotating element 403 shown in FIG. 12(a). Since the center portion (indicated by oblique hatching) of the optically rotating element 403 is formed from a 90-degree twisted nematic liquid crystal element 404, the polarization direction of the linearly polarized light 402 is rotated through 90 degrees and thus made to orient in the X-axis direction. On the other hand, the portion other than the center portion of the optically rotating element 403 is formed from a homogeneous-type liquid crystal element 405 and, therefore, does not have the ability to rotate the linearly polarized light. At this time, as is apparent from the previously given explanation, the optically rotating element 403 does not have any phase distribution for the effective beam 406 of the linearly polarized light 402. Further, at the entrance side of the liquid crystal element on which the linearly polarized light 402 is incident, an orientation axis of the liquid crystal molecules are aligned substantially parallel to the Y-axis direction.

The effective beam 406 passed through the optically rotating element 403 is passed through the optical splitter 407 and focused by the first collective lens 408 onto the optical disk 409. The super-resolution optical spot reads a signal recorded as a pit on the optical disk 409 and is reflected back. The reflected light is passed again through the first collective lens 408, is reflected by the optical splitter 407, constructed from a prism or a half mirror or the like, and is focused by the second collective lens 410 onto the optical signal detection element 411. At this time, the side lobes that would be formed on the optical signal detection element 411 are eliminated by the linear polarization detection element 412 disposed as the polarization selective means near the second collective lens 410.

If the optical disk substrate or the like has a large optical birefringence, there arises the possibility that the resultant vector produced by the side lobes of the super-resolution optical spot reflected from or passed through the optical disk may have an elliptical polarization. If this happens, the side lobes of the super-resolution optical spot cannot be completely eliminated by the linear polarization detection element 412. However, if the optically rotating element 403 is deliberately designed with such an optical birefringence that cancels the birefringence of the optical disk substrate, etc. it becomes possible to eliminate the side lobes of the super-resolution optical spot.

One possible way to cancel the birefringence of the optical disk substrate, etc. is to deliberately give a suitable elliptical polarization to the beam passed through the optically rotating element. That is, since the linearly polarized light is turned into elliptically polarized light because of the birefringence of the optical disk substrate, such elliptical polarization as offsets the elliptically polarized light should be given in advance. There are five possible methods of doing this.

In the first method, the polarization axis of the linearly polarized incident light is slightly displaced relative to the orientation axis of the liquid crystal (the long axis direction of the liquid crystal molecules). In this case, the angle of displacement is preferably within a range of −5 degrees to +5 degrees. When the polarization axis of the incident light is displaced in this way, optical birefringence occurs because the linearly polarized incident light traverses the liquid crystal by being influenced not only by the long axis components of the liquid crystal molecules but also by the short axis components thereof. The beam emerging from the optically rotating element is thus elliptically polarized.

In the second method, the polarization axis is not displaced, but a voltage slightly higher than the threshold voltage (Vth, see FIG. 13) (preferably, higher by a factor of 1.0 to about 1.3) is applied to the entire liquid crystal element. When a voltage slightly higher than the threshold voltage (Vth) is applied, the liquid crystal molecules stand up parallel to the direction of the electric field, and this, in effect, changes the refractive index of the liquid crystal for the linearly polarized incident light. As a result, the liquid crystal element is put out of its ideal operating condition, and the beam emerging from the optically rotating element is thus elliptically polarized.

In the third method, the liquid crystal is designed in advance so that it will operate in a condition shifted from its ideal operating condition.

In the fourth method, an element that causes an optical birefringence, similar to the optical birefringence of the optical disk substrate, is inserted in the light path between the optical signal detection element 411 and the optical disk 409.

In the fifth method, the above four methods are used in appropriate combinations.

Further, a bias voltage higher than the voltage Vth may be applied to compensate for the variation in the characteristics of the liquid crystal element due to manufacturing variations of the liquid crystal element or changes in temperature, and for the variation in the wavelength of the semiconductor laser light source due to changes in temperature.

The rotatory power of the optically rotating element 403 in this embodiment can also be disabled by electrical means, as explained in the description of the second embodiment. Therefore, when reading a CD, the optical rotating can be disabled to switch the resolution mode to normal resolution, and when reading a DVD having a higher pit density than the CD, the rotatory power can be enabled to switch the resolution mode to super resolution.

In order that both CD and DVD can be read properly, it is preferable to modify the present embodiment as described below.

In the case of a CD or a CD-R (recordable CD), the rotatory power of the optically rotating element 403 is disabled, and reading or writing is done on the CD or CD-R by using a 780 nm semiconductor laser as the light source for linearly polarized light and a known CD pickup lens as the first collective lens. On the other hand, in the case of a DVD, the rotatory power of the optically rotating element 403 is enabled to switch the resolution mode to super resolution to generate a smaller optical spot, and the DVD is read by using a known DVD pickup lens in place of the CD pickup lens.

Traditionally, in addition to the 780 nm laser light source for CDs or CD-Rs, a 650 nm laser light source was needed for DVD reading, but with the above configuration, it becomes possible to read DVDs as well as CDs and CD-Rs by using only one laser of 780 nm wavelength. In particular, since the DC-R does not possess sensitivity to light of 650 nm wavelength, being able to read DVDs by using the laser light source of 780 nm wavelength offers a great advantage.

Here, switching between the known CD pickup lens and the known DVD pickup lens can be accomplished by using a known switching means such as a mechanical means. The reason that the high-resolution DVD lens cannot be directly used for reading CDs is that the disk substrate thickness differs between DVD (0.6 mm) and CD (1.2 mm) and, therefore, the amount of spherical aberration occurring depending on the substrate thickness differs between them. However, if a known design is employed that uses a single pickup lens for both DVD and CD, switching from one lens to the other is not needed between DVD reading and CD reading.

Further, when the percentage of the center portion 404 of the optically rotating element 403 is about 20%, the optical spot on the optical disk becomes about 15% smaller. This, in effect, is equivalent to making the laser wavelength 15% shorter. Accordingly, in the present embodiment, the center portion 404 of the optically rotating element 403 is made to occupy about 20% of the area of the optically rotating element 403, thereby achieving an effect equivalent to making the laser wavelength of 780 nm about 15% shorter to about 663 nm, making it possible to form an optical spot small enough to read a DVD. It will, however, be noted that the relationship between the percentage of the center portion 404 of the optically rotating element 403 and the percentage by which the optical spot is reduced in size somewhat varies depending on the type of the optical device.

(Embodiment 5)

Figure 5:
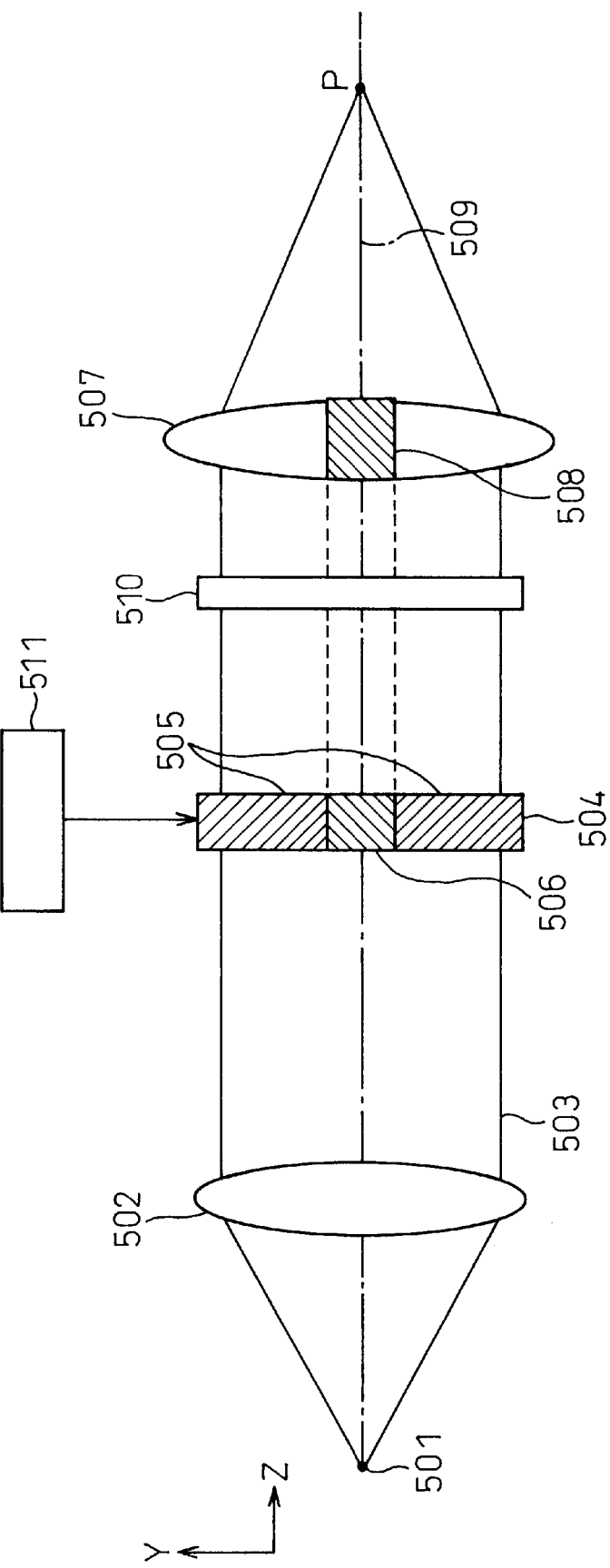
FIG. 5 is a diagram showing a configuration example of an optical device according to a fifth embodiment of the present invention.
Figure 6:
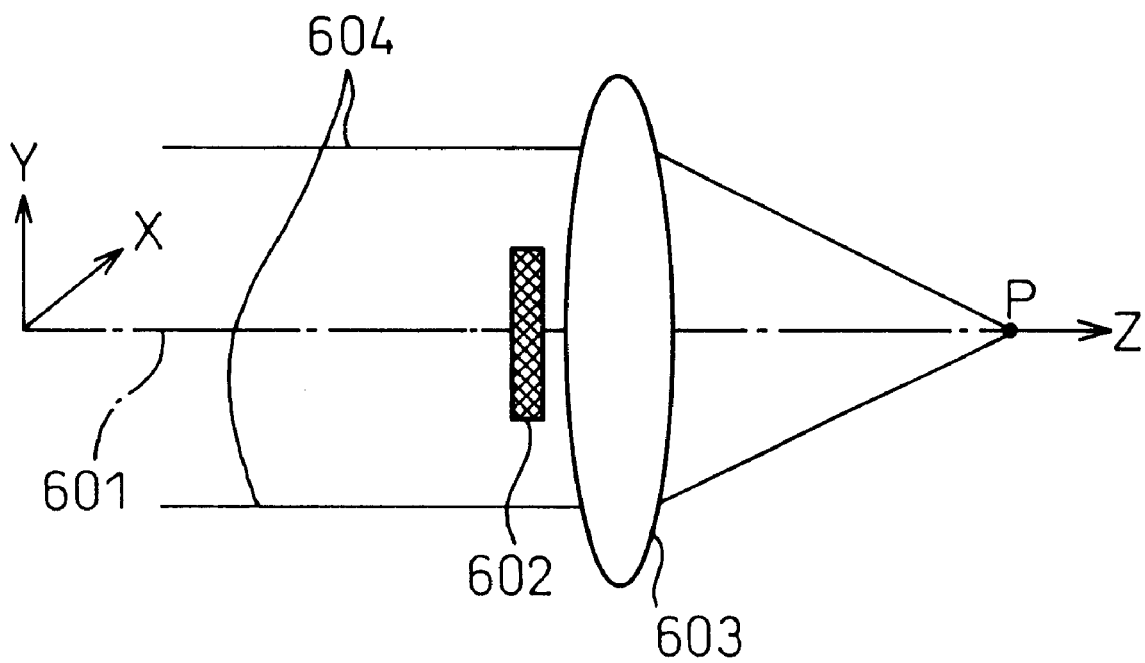
FIG. 6 is a diagram for explaining the principle of a super-resolution optical device.

An optical device according to a fifth embodiment of the present invention will be described below with reference to FIG. 5. The optical device of the fifth embodiment is assumed for use with an optical pickup designed to be compatible with all of DVD, CD, CD-R, CD-RW, etc. For simplicity, FIG. 5 depicts the optical device projected on a two-dimensional YZ plane. The actual optical device is rotationally symmetrical about its optical axis 509. Detection optics that do not have direct relevance to the present invention are not shown here.

In the optical device of the fifth embodiment, a laser light source 501 emits linearly polarized light of about 780 nm wavelength, and the linearly polarized laser light 503 collimated by a collimator lens 502 into a parallel plane wave enters a liquid-crystal spatial light modulator 504. The orientation axis of the liquid crystal molecules in the liquid-crystal spatial light modulator 504 is oriented substantially parallel to the Y-axis direction, the same direction as the polarization axis of the linear polarization laser light source 501. The liquid-crystal spatial light modulator 504 consists at least of a portion (indicated by oblique hatching slanted upward to the left) that is formed from a homogeneous-type liquid crystal element and functions as a diffraction lens element 505 and a portion (indicated by oblique hatching slanted upward to the right) that is formed from a 90-degree twisted nematic liquid crystal and functions as an optically rotating element 506. Each function is controlled by an electrical signal supplied from a power source 511. The portion functioning as the diffraction lens element 505 acts as a lens having a focal length, f1, while the portion functioning as the optically rotating element 506, as opposed to the other portion, has the ability to rotate the polarization axis of the linearly polarized incident light through 90 degrees. The portion functioning as the optically rotating element 506 acts on a substantially circular area 508 centered about the optical axis of a collective lens 507.

Figure 14:
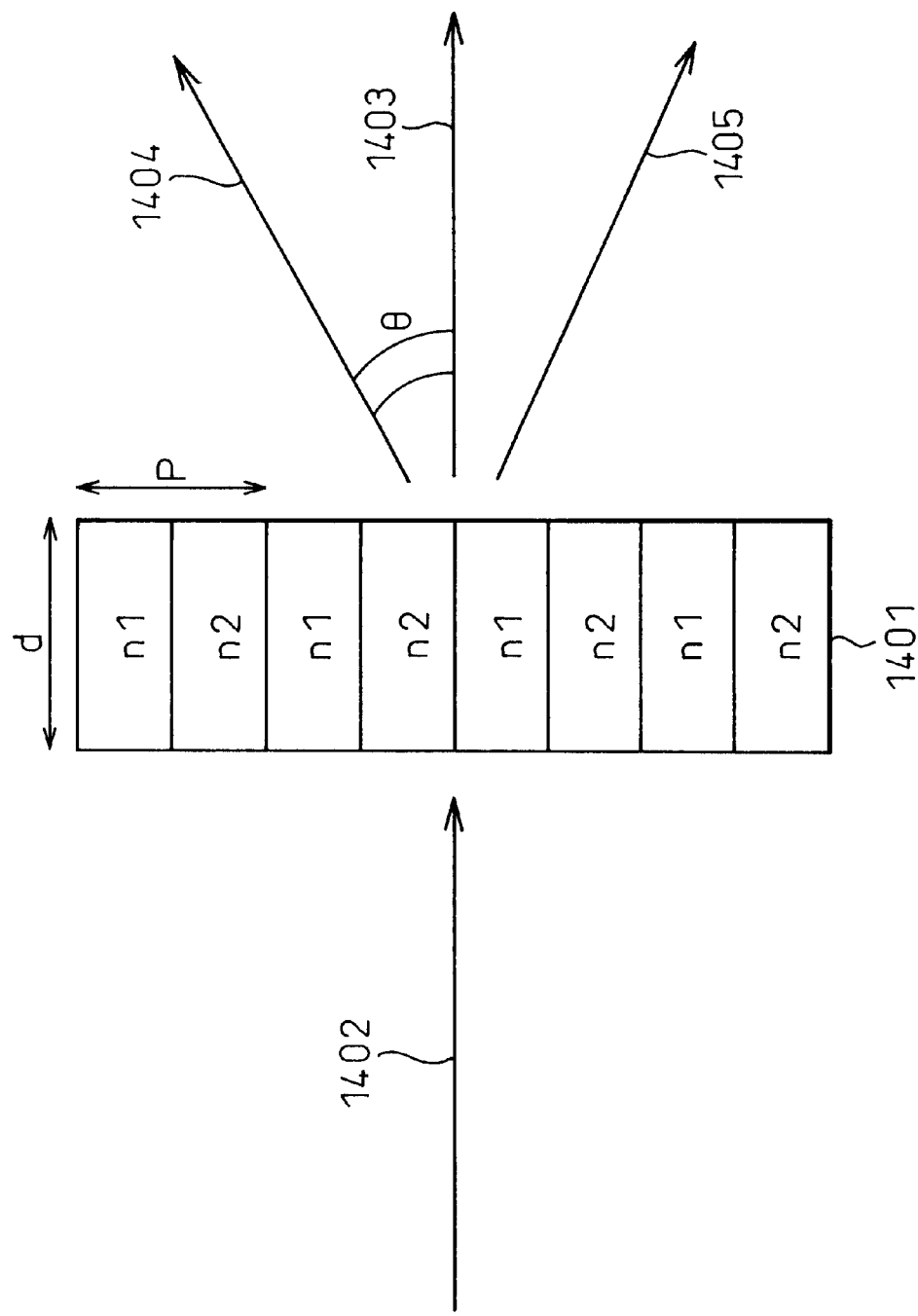
FIG. 14 is a diagram for explaining a diffraction phenomenon of light, produced by a binary-type phase diffraction grating.

The diffraction lens element will be described with reference to FIG. 14. FIG. 14 illustrates a diffraction phenomenon of light, produced by a conventional binary-type, substantially transparent phase diffraction grating. For simplicity, a cross section projected on a two-dimensional plane is shown here. When laser light 1402 enters the phase diffraction grating 1401 having a thickness d and different refractive indices n1 and n2 alternating at a pitch P, the laser light emerges as diffracted light as a result of diffraction effects. For simplicity, it is assumed here that the laser light 1402 is incident perpendicularly to the phase diffraction grating 1401. Usually, at this time, a beam 1403 of order 0, which is passed unchanged, and beams 1404 and 1405 of orders 1 and −1, which are diffracted in directions θ and −θ, respectively, occur (higher-order diffracted beams with greater diffraction angles also occur, but they are ignored as their percentage is small). The diffraction angle θ is determined by $\sin(\theta) = \lambda/P$, where λ is the wavelength of the laser light 1402.

When the areas of the n1 and n2 regions for the laser light 1402 are nearly the same, and when the optical path difference (n1−n2)=d is equal to $\lambda/2$, then the grating is called a Ronchi grating, and it is known that, with this grating, the beam 1403 of order 0 disappears. On the other hand, when the optical path difference (n1−n2)=d is equal to λ, and when the refractive index is varied smoothly and continuously from n1 to n2, repeating at the pitch P, then the grating is called a blazed grating, and it is known that, with this grating, only the beam 1404 or order 1 occurs. It is also known that when the refractive index is varied incrementally in 16 or more steps from n1 to n2, an almost ideal blazed grating is achieved, and the grating is then called a multi-level binary grating. Generally, a phase diffraction grating has an advantage over an amplitude diffraction grating containing an opaque portion, since the efficiency of light utilization is higher. As is generally known, various lens effects can be achieved by continuously varying the pitch of the above diffraction grating, and a typical example of this is the Fresnel lens.

Figure 15:
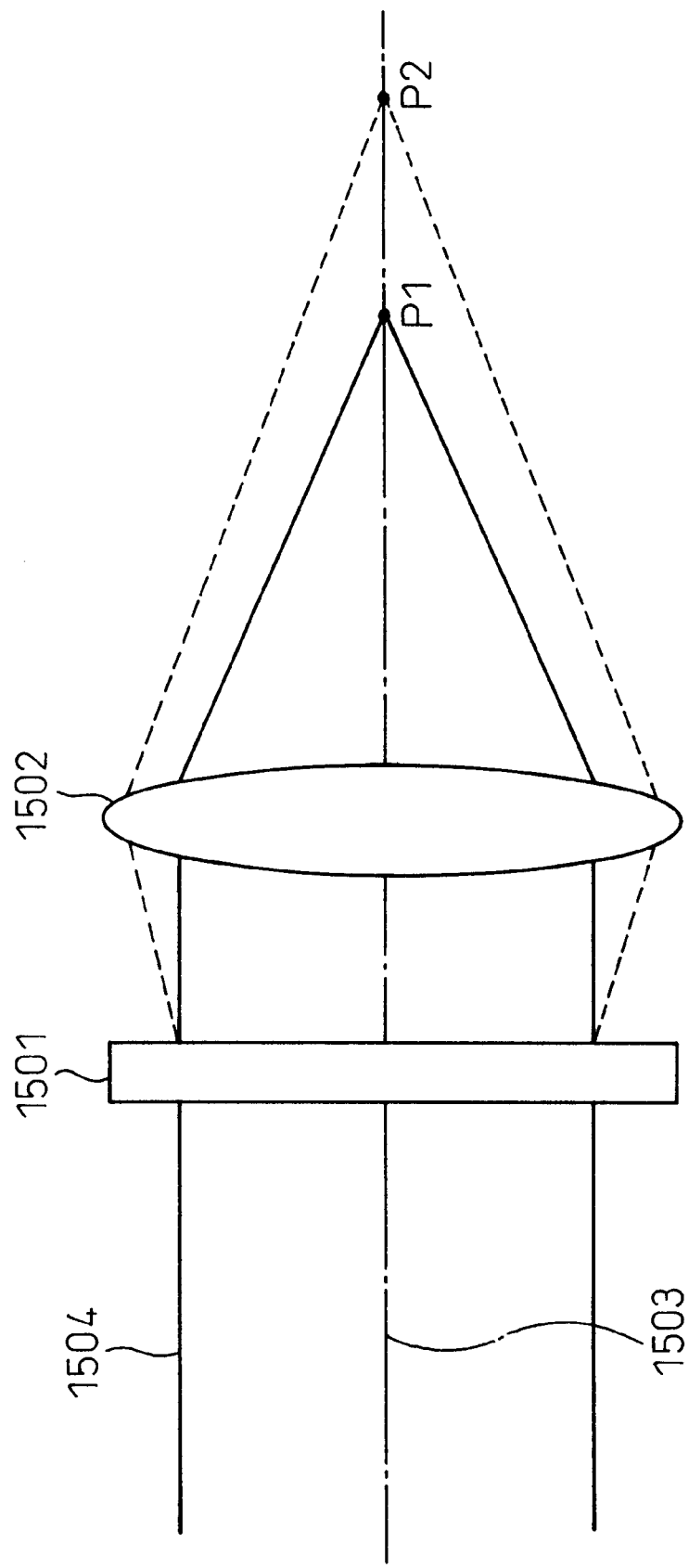
FIG. 15 is a diagram for explaining the principle of a variable focus optical device using a liquid crystal Fresnel lens.

In view of this, the operating principle of a diffraction lens element using a liquid crystal Fresnel lens will be described with reference to FIG. 15. For simplicity, a cross section is shown, but in actuality, the structure is rotationally symmetrical about its optical axis 1503. The liquid crystal Fresnel lens 1501 is formed with a transparent electrode having a Fresnel lens pattern that functions as a lens with a focal length f1, and when a suitable voltage is applied to the transparent electrode, the liquid crystal Fresnel lens 1501 functions as a lens. At this time, the focal length of the optical device is given by the sum of the focal length of the liquid crystal Fresnel lens 1501 and that of a collective lens 1502, so that laser light 1504 is focused at point P2. In the absence of an applied voltage, the liquid crystal Fresnel lens 1501 does not function as a lens, in which case the focal length of the optical device is equal to the focal length of the collective lens 1502, so that the laser light 1504 is focused at point P1. This means that the focal length, and hence the numerical aperture, of the optical device has been changed by applying a voltage to, or removing the applied voltage from, the liquid crystal Fresnel lens 1501.

Next, the liquid-crystal spatial light modulator 504 employed in the fifth embodiment of the present invention will be described with reference to FIGS. 16(*a*) and 16(*b*). FIGS. 16(*a*) and 16(*b*) each depict the cross-sectional structure of the electrically controllable liquid-crystal spatial light modulator 504. The portion near the optical axis is formed from a 90-degree twisted nematic liquid crystal element 1603, and the other portion is formed from a homogenous-type liquid crystal element 1602. The function of each element is the same as that described in the second embodiment of the present invention.

On one glass substrate are formed ring-shaped transparent electrodes 1610 at different pitches. The other glass substrate is coated with a transparent electrode over its entire surface. Suppose here that laser light 1604 linearly polarized in the Y-axis direction enters the liquid-crystal spatial light modulator 504.

When no voltage is applied to the liquid-crystal spatial light modulator 504, as shown in FIG. 16(*a*), the refractive index is n1 throughout for the linearly polarized laser light 1604. As a result, diffraction does not occur, and the linearly polarized light 1604 is passed through and emerges as emergent light 1611. Near the optical axis, however, the polarization axis is rotated through 90 degrees, achieving super resolution as previously described. Strictly, a slight amount of diffraction occurs due to the presence of the transparent electrodes 1610, but if the refractive index of the transparent electrodes 1610 is made equal to the diffraction index in the long axis direction of the liquid crystal element, the diffraction due to the presence of the transparent electrodes 1610 does not occur.

Next, when a voltage of sufficient magnitude is applied between the transparent electrodes 1610 by a power source 1609, as shown in FIG. 16($b$), the portions of the liquid crystal element to which the voltage is applied are driven to a hometropic state. This results in the structure in which the refractive index for the linearly polarized light 1604 alternates between n1 and n2 at different pitches. The structure therefore functions as a binary-type phase diffraction grating similar to the one shown in FIG. 14, and a beam 1605 of order 0, a beam 1606 of order 1, and a beam 1607 of order −1 are generated. At this time, if the previously given conditions for a Ronchi grating are satisfied, the beam 1605 of order 0 does not occur. If the previously given conditions for a multilevel binary grating are satisfied, only the beam 1606 of order 1 occurs. To achieve the multilevel structure, however, the transparent electrodes 1610 must be formed at finer pitches, and the applied voltage must be varied in incremental steps.

Figure 17:
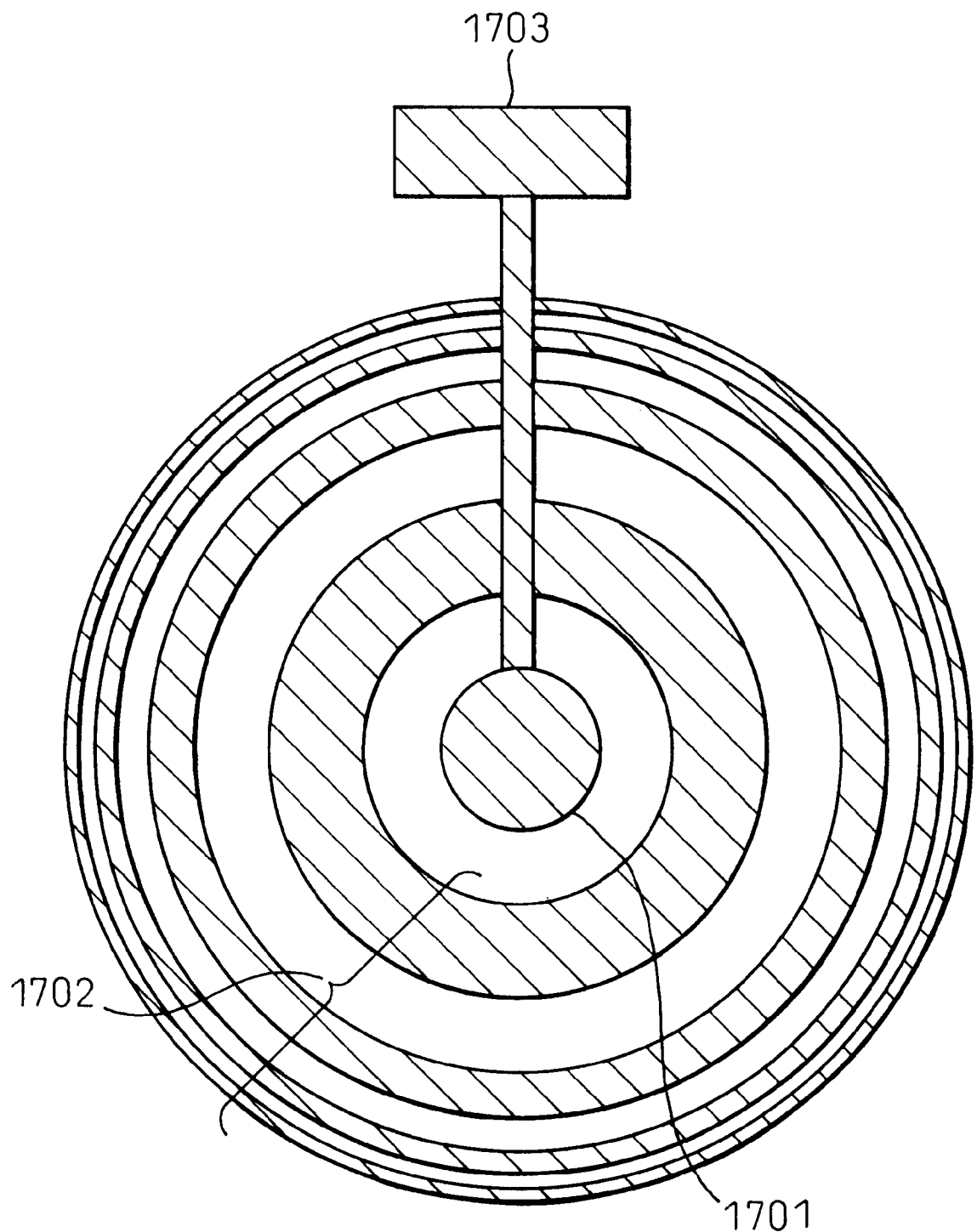
FIG. 17 is a diagram showing the arrangement of transparent electrodes in the liquid-crystal spatial light modulator employed in the present invention.

Next, the electrode shape of the liquid-crystal spatial light modulator 504 will be described with reference to FIG. 17. The electrode of the liquid-crystal spatial light modulator includes a circular region 1701 in the center and a plurality of ring-shaped regions 1702 that are concentric with the center of the circular region 1701, and each electrode region is connected to a terminal electrode 1703. Though only four ring-shaped regions are shown in the schematic diagram, actually there are several tens to hundreds of ring-shaped regions. When an electrical signal is applied via the terminal electrode 1703, the ring-shaped regions 1702 function as a diffraction lens and, at the same time, the optical rotating power of the circular region 1701 is lost.

Turning back to FIG. 5, the operation in the fifth embodiment of the present invention will be described. First, the function of the diffraction lens element 505 is disabled, and the function of the optically rotating element 506 is enabled. At this time, since the linearly polarized light passed through the optically rotating element 506 is orthogonal to the linearly polarized light passed through the diffraction lens element 505, super resolution occurs. It can be seen that the numerical aperture of the optical device at this time is determined by the converging lens 507. It is also found experimentally that if super resolution of about 15% is to be achieved, the cross-sectional area of the optically rotating element 506 should be made about 20% of the area shone by the linearly polarized laser light 503. This state is used for DVD reading/writing.

In this case, as previously explained in the description of the second embodiment, the side lobes of the super-resolution optical spot are eliminated by the linear polarization detection element 510 acting as the polarization selective means. In FIG 5, since light detection optics are omitted for convenience of illustration, the linear polarization detection element 510 is shown as being placed between the collective lens 507 and the liquid-crystal spatial light modulator 504, but it may be placed in some other suitable position, as in the case of the fourth embodiment of the present invention.

Next, the function of the optically rotating element 506 is disabled, and the function of the diffraction lens element 505 is enabled. In this state, super resolution does not occur. At this time, the focal length of the optical device is given by the sum of the focal length of the diffraction optical element 506 and that of the collective lens 507, which means that the numerical aperture has been changed compared with the case where it is determined only by the collective lens 507. To interpret it in another way, the spherical aberration that occurs when reading a CD using the collective lens 507 is corrected for by the diffraction lens element. This state is used for CD reading.

Strictly speaking, the center portion of the diffraction lens element 505 can hardly function as a lens because the center portion is formed as the optically rotating element 506. However, since the focal length of the diffraction lens element necessary to switch the numerical aperture between DVD and CD is several tens of mm to several hundreds of mm, the center portion need not necessarily function as a lens in the first placed. According to the other interpretation given above, the spherical aberration that occurs when reading a CD is proportional to the cube of the lens aperture, and the center portion does not have much effect on it. As earlier noted, when achieving super resolution of about 15% the cross-sectional area of the optically rotating element 506 in the center portion is about 20% and, therefore, does not have much effect.

As is apparent from the above description, the function f the diffraction lens element 505 and the function of the optically rotating element 506 are controlled to change the effective numerical aperture of the optical device, thereby making it possible to change the effective wavelength of the laser. The numerical aperture achieved when the diffraction lens element 505 is enabled can be used for DVD reading, but in this case, if writing to DVD is needed, the efficiency of the diffraction lens element must be increased so as to providing the necessary optical power for writing.

In the fifth embodiment of the present invention, the function of the diffraction lens element 505 and the function of the optically rotating element 506 are enabled at the same time, but it is also possible to electrically control them so that the functions are enabled separately.

For example, when reading a DVD, a 780 nm semiconductor laser light source and a known DVD pickup lens are used, and only the function of the optically rotating element 506 is enabled to generate a super-resolution optical spot for reading the DVD. On the other hand, when performing reading/writing on a CD or CD-R, only the function of the diffraction lens element 505 is enabled to correct for the spherical aberration of the DVD pickup lens, and reading or writing is performed on the DC or CD-R by using the same light source and pickup lens used for DVD reading.

The third to fifth embodiments of the present invention have been described by dealing with the case where the present invention is applied specifically to an optical disk pickup, but it will be appreciated that the present invention is also applicable to various other apparatuses such as measuring instruments, recording apparatuses, and other apparatuses using power laser.

The first to fifth embodiments have each been described for a method or device for eliminating side lobe itself by using the polarization selective means. However, it is also possible to eliminate side lobe components by using the same method and device. A side lobe component occurs when a side lobe of an optical spot is reflected from a pit, a scratch, or the like on the optical disk, disrupting the shape of the side lobe (due to scattering, diffraction, etc.) and causing a portion of it overlapping into the main lobe. As earlier described, the side lobe component, like the side lobe itself, has a direction different from that of the main lobe, and can therefore be eliminated using a similar polarization selective means.

As is apparent from the description so far given, in the optical device of the present invention that uses the optically rotating element as the polarization selective means, the side lobes, or their components, peculiar to super resolution can be eliminated using a simple configuration. That is, the side lobes or their components can be completely eliminated, rather than incorporating them into the center spot, and super resolution free from side lobes can thus be achieved.

Further, compared with the liquid crystal display panel used for a personal computer or the like, the liquid crystal element used in the present invention is smaller in size and much simpler in construction and, therefore, does lead to a substantial cost increase. Besides, for the polarization selective means, an inexpensive element as used in commercially available liquid crystal devices can be used without any modification. Furthermore, compared with the method that inserts slits in the focused spot position to block only the side lobes of the focused spot, as practiced in the prior art, the alignment of components is very simple in the present invention.

When applying the present invention to a pickup optical device for an optical disk, the linear polarization detection element need not necessarily by placed directly behind the optically rotating element. In such an application, the linear polarization detection element need only be placed before the optical signal detector. This offers the advantage of being able to increase the efficiency of light utilization, since there is no need to insert the linear polarization detection element in the light path along which the optical spot is focused on the optical disk.

Furthermore, in the present invention, since switching between super resolution and normal resolution can be easily effected using an electrical signal, DVD-CD reading and other operations can be performed using one 780 nm laser, unlike the prior art DVD-CD compatible optical pickup that required two lasers, one of 780 nm and the other of 650 nm.

Moreover, the super resolution achieved according to the present invention has the advantage that, compared with the case of simply increasing the numerical aperture, the focal depth increases by 10 to 20%, serving to increase the auto focusing servo margin for the optical pickup. A further advantage is that the occurrence of coma can also be suppressed, as compared with the case of simply increasing the numerical aperture.

No matter how short the wavelength of the laser light source is made, and now matter how large the numerical aperture NA of the lens is made, if the super resolution of the present invention is used the optical spot diameter can be reduced by about 20% without causing concern about the possible occurrence of side lobes in such an optical device, and switching between super resolution and normal resolution can be easily effected by electrical means without using any movable parts.

Furthermore, the side lobe elimination method and device of the present invention have the advantage that if the shape of a side lobe is disrupted by scattering, diffraction, etc. causing a portion of it overlapping into the main lobe, such a side lobe component can also be eliminated.

What is claimed is:

1. An optical device having a light generating means for generating incident light and a lens system for collecting said incident light and producing a super-resolution optical spot containing a main lobe and a side lobe by modulating a portion of said incident light, comprising:

polarization vector modulating means for making polarization vectors of said side lobe and said main lobe differ from each other so that one or the other of said polarization vectors can be selected; and polarization selective means for eliminating said side lobe by selecting the polarization vector of said main lobe.

2. The optical device of claim 1, wherein said polarization vector modulating means has the function of making polarization planes of said main lobe and said side lobe differ from each other.

3. The optical device of claim 2, wherein said polarization vector modulating means has the function of converting said side lobe into linearly polarized light.

4. The optical device of claim 3, wherein said polarization vector modulating means has the function of converting said main lobe into linearly polarized light.

5. The optical device of claim 1, wherein said light generating means generates a linearly polarized light, and said polarization vector modulating means is an optically rotating element for converting said linearly polarized light into a beam that generates a main lobe and a side lobe having a polarization vector different from the polarization vector of said main lobe.

6. The optical device of claim 5, wherein said optically rotating element converts said linearly polarized light into two linearly polarized beams orthogonal to each other.

7. The optical device of claim 5, wherein said linearly polarized light generating means is a semiconductor laser device.

8. The optical device of claim 5, wherein said linearly polarized light is coherent light.

9. The optical device of claim 5, wherein said optically rotating element has substantially no phase distribution for said linearly polarized light within an effective beam of said linearly polarized light incident on said optically rotating element.

10. The optical device of claim 5, wherein said optically rotating element includes a first functional portion and a second functional portion, said first and said second functional portion having mutually different polarization rotating characteristics.

11. The optical device of claim 10, wherein said first functional portion is formed a region having a homogeneous alignment, and said second functional portion is formed from a region having a 90-degree twisted nematic alignment.

12. The optical device of claim 5, wherein the polarization rotating characteristics of said first and said second functional portion are made different from each other by about 90 degrees in terms of the angle of rotation.

13. The optical device of claim 5, wherein said first functional portion includes a region near an optical axis, and said second functional portion consists of regions other than said first functional portion.

14. The optical device of claim 5, wherein said optically rotating element comprises a homogeneous-type liquid crystal element and a 90-degree twisted nematic liquid crystal element whose orientation axis of liquid-crystal molecular is oriented substantially parallel or perpendicular to the polarization axis of said linearly polarized light.

15. The optical device of claim 14, wherein said 90-degree twisted nematic liquid crystal element is formed in a region near the optical axis of said linearly polarized light.

16. The optical device of claim 15, wherein said region near said optical axis is substantially circular or rectangular in shape.

17. The optical device of claim 14, wherein said homogeneous-type liquid crystal element is formed in a region near the optical axis of said linearly polarized light.

18. The optical device of claim 17, wherein said region near said optical axis is substantially circular or rectangular in shape.

19. The optical device of claim 5, wherein said polarization selective means is disposed so as to have an azimuth whose angle, relative to the azimuth of said linearly polarized light incident on said optically rotating element, not smaller than 0 degrees and not greater than 90 degrees, when measured toward the direction in which said optically rotating element rotates said linearly polarized light through 90 degrees.

20. The optical device of claim 5, further comprising a collective lens for collecting said beam.

21. The optical device of claim 5, wherein said main lobe is linearly polarized light, and said side lobe is linearly polarized light oriented in a different direction than said main lobe.

22. The optical device of claim 5, wherein said polarization selective means is a linear polarizing filter.

23. An optical device comprising:
means for generating linearly polarized light;
an optically rotating element for converting said linearly polarized light into a beam that generates a main lobe and a side lobe oriented in a different direction than said main lobe;
a first collective lens for collecting said beam onto an optical disk;
an optical detector for detecting information recorded on said optical disk;
a second collective lens for collecting a beam, reflected from said optical disk, onto said optical detector; and
polarization selective means for eliminating only said side lobe from said beam.

24. The optical device of claim 23, wherein said linearly polarized light generating means is a semiconductor laser device.

25. The optical device of claim 23, wherein said linearly polarized light is coherent light.

26. The optical device of claim 23, wherein said optically rotating element has substantially no phase distribution for said linearly polarized light within an effective beam of said linearly polarized light incident on said optically rotating element.

27. The optical device of claim 23, wherein said optically rotating element acts only on a region near the optical axis of said incident linearly polarized light or only on a region other than said region near said optical axis.

28. The optical device of claim 27, wherein said optically rotating element comprises a homogeneous-type liquid crystal element and a 90-degree twisted nematic liquid crystal element whose orientation axis of liquid-crystal molecules is oriented substantially parallel or perpendicular to the polarization axis of said linearly polarized light.

29. The optical device of claim 28, wherein said 90-degree twisted nematic liquid crystal element is formed in a region near the optical axis of said linearly polarized light.

30. The optical device of claim 28, wherein said homogeneous-type liquid crystal element is formed in a region near the optical axis of said linearly polarized light.

31. The optical device of claim 30, wherein said region near said optical axis is substantially circular or rectangular in shape.

32. The optical device of claim 27, wherein said region near said optical axis is substantially circular or rectangular in shape.

33. The optical device of claim 23, wherein said polarization selective means is disposed so as to have an azimuth whose angle, relative to the azimuth of said linearly polarized light incident on said optically rotating element, not smaller than 0 degrees and not greater than 90 degrees, when measured toward the direction in which said optically rotating element rotates said linearly polarized light through 90 degrees.

34. The optical device of claim 23, further comprising a collective lens for collecting said beam.

35. The optical device of claim 23, wherein said main lobe is linearly polarized light, and said side lobe is linearly polarized light oriented in a different direction than said main lobe.

36. The optical device of claim 23, wherein said polarization selective means is a linear polarizing filter.

37. The optical device of claim 23, wherein said optically rotating element has rotatory power that is capable of being enabled or disabled electrically.

38. The optical device of claim 23, wherein said beam is collected on a different kind of optical disk when the rotatory power of said optically rotating element is disabled than when the rotatory power of said optically rotating element is enabled.

39. The optical device of claim 38, wherein said different kinds of optical disks are a DVD and a CD, respectively.

40. The optical device of claim 38, wherein said different kinds of optical disks are a DVD and a CD-R, respectively.

41. An optical device comprising:
means for generating linearly polarized light;
a diffraction lens element whose diffraction function is capable of being enabled or disabled by an electrical signal;
an optically rotating element for converting said linearly polarized light into a beam that generates a main lobe and a side lobe oriented in a different direction than said main lobe;
a collective lens for collecting said beam onto an optical disk; and
polarization selective means for eliminating only said side lobe from said beam.

42. The optical device of claim 41, wherein when the diffraction function of said diffraction lens element is enabled, said optical device has a focal length equal to the sum of the focal lengths of said diffraction lens element and said collective lens, while when the diffraction function of said diffraction lens element is disabled, the focal length of said optical device is equal to the focal length only of said collective lens.

43. The optical device of claim 41, wherein said diffraction lens element is a liquid crystal Fresnel lens.

44. The optical device of claim 41, wherein said diffraction lens element and said optically rotating element are together constructed as a one-piece member.

45. The optical device of claim 41, wherein said linearly polarized light generating means is a semiconductor laser device.

46. The optical device of claim 41, wherein said linearly polarized light is coherent light.

47. The optical device of claim 41, wherein said optically rotating element has substantially no phase distribution for said linearly polarized light within an effective beam of said linearly polarized light incident on said optically rotating element.

48. The optical device of claim 41, wherein said optically rotating element acts only on a region near the optical axis of said incident linearly polarized light or only on a region other than said region near said optical axis.

49. The optical device of claim 48, wherein said optically rotating element comprises a homogeneous-type liquid crystal element and a 90-degree twisted nematic liquid crystal element whose orientation axis of liquid-crystal molecular is oriented substantially parallel or perpendicular to the polarization axis of said linearly polarized light.

50. The optical device of claim 49, wherein said 90-degree twisted nematic liquid crystal element is formed in a region near the optical axis of said linearly polarized light.

51. An optical device as claimed in claim 50, wherein the region near said optical axis is substantially circular or rectangular in shape.

52. The optical device of claim 49, wherein said homogeneous-type liquid crystal element is formed in said region near the optical axis of said linearly polarized light.

53. The optical device of claim 52, wherein said region near said optical axis is substantially circular or rectangular in shape.

54. The optical device of claim 41, wherein said polarization selective means is disposed so as to have an azimuth whose angle, relative to the azimuth of said linearly polarized light incident on said optically rotating element, not smaller than 0 degree and not greater than 90 degrees, when measured toward the direction in which said optically rotating element rotates said linearly polarized light through 90 degrees.

55. The optical device of claim 41, further comprising a collective lens for collecting said beam.

56. The optical device of claim 41, wherein said main lobe is linearly polarized light, and said side lobe is linearly polarized light oriented in a different direction than said main lobe.

57. The optical device of claim 41, wherein said polarization selective means is a linear polarizing filter.

58. The optical device of claim 41, wherein said optically rotating element has rotatory power that is capable of being enabled or disabled electrically.

59. The optical device of claim 41, wherein said beam is collected on a different kind of optical disk when the diffraction function of said diffraction lens element is disabled than when the diffraction function of said diffraction lens element is enabled.

60. The optical device of claim 59, wherein said different kinds of optical disks are a DVD and a CD, respectively.

61. The optical device of claim 59, wherein said different kinds of optical disks are a DVD and a CD-R, respectively.

* * * * *